(12) United States Patent
Park

(10) Patent No.: US 9,752,361 B2
(45) Date of Patent: Sep. 5, 2017

(54) MULTISTAGE HINGE

(71) Applicant: Microsoft Technology Licensing, LLC, Redmond, WA (US)

(72) Inventor: Daniel C. Park, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/743,137

(22) Filed: Jun. 18, 2015

(65) Prior Publication Data
US 2016/0369543 A1 Dec. 22, 2016

(51) Int. Cl.
| | |
|---|---|
| *H04M 1/00* | (2006.01) |
| *E05D 11/08* | (2006.01) |
| *F16M 11/10* | (2006.01) |
| *F16M 13/00* | (2006.01) |
| *G06F 1/16* | (2006.01) |
| *E05D 11/10* | (2006.01) |

(52) U.S. Cl.
CPC ........ *E05D 11/082* (2013.01); *E05D 11/1007* (2013.01); *F16M 11/10* (2013.01); *F16M 13/005* (2013.01); *G06F 1/1681* (2013.01); *E05D 2011/085* (2013.01); *E05Y 2900/606* (2013.01)

(58) Field of Classification Search
CPC ............... E05D 11/082; E05D 11/1007; E05D 2011/085
USPC ...................................................... 455/575.1
See application file for complete search history.

(56) References Cited

U.S. PATENT DOCUMENTS

| | | | |
|---|---|---|---|
| 375,394 A | 12/1887 | Strachan | |
| 457,824 A | 8/1891 | Curtis | |
| 578,325 A | 3/1897 | Fleming | |
| 2,056,805 A | 10/1936 | Reichard | |
| 2,770,834 A | 11/1956 | Jannace | |
| 4,046,975 A | 9/1977 | Seeger, Jr. | |
| 4,065,649 A | 12/1977 | Carter et al. | |
| 4,243,861 A | 1/1981 | Strandwitz | |
| 4,302,648 A | 11/1981 | Sado et al. | |

(Continued)

FOREIGN PATENT DOCUMENTS

| | | |
|---|---|---|
| CA | 990023 | 6/1976 |
| CN | 202441167 | 9/2012 |

(Continued)

OTHER PUBLICATIONS

"Accessing Device Sensors", retrieved from <https://developer.palm.com/content/api/dev-guide/pdk/accessing-device-sensors.html> on May 25, 2012, 2011, 4 pages.

(Continued)

*Primary Examiner* — Amancio Gonzalez

(57) ABSTRACT

A multistage hinge is described. In at least some embodiments, the described hinge mechanism enables a support component to be adjustably attached to an apparatus, such as a computing device. According to various embodiments, a hinge mechanism includes different activity stages where movement of the hinge is based on different activity mechanisms. For instance, the hinge mechanism includes a spring-activated mechanism that controls movement of the hinge over a particular range of angles. Further, the hinge mechanism includes a friction mechanism (e.g., a "friction engine") that controls movement of the hinge over a different range of angles.

20 Claims, 30 Drawing Sheets

(56) References Cited

U.S. PATENT DOCUMENTS

| | | | |
|---|---|---|---|
| 4,317,013 | A | 2/1982 | Larson |
| 4,365,130 | A | 12/1982 | Christensen |
| 4,492,829 | A | 1/1985 | Rodrique |
| 4,527,021 | A | 7/1985 | Morikawa et al. |
| 4,559,426 | A | 12/1985 | Van Zeeland et al. |
| 4,577,822 | A | 3/1986 | Wilkerson |
| 4,588,187 | A | 5/1986 | Dell |
| 4,607,147 | A | 8/1986 | Ono et al. |
| 4,651,133 | A | 3/1987 | Ganesan et al. |
| 4,735,394 | A | 4/1988 | Facco |
| 5,008,497 | A | 4/1991 | Asher |
| 5,128,829 | A | 7/1992 | Loew |
| 5,220,521 | A | 6/1993 | Kikinis |
| 5,283,559 | A | 2/1994 | Kalendra et al. |
| 5,331,443 | A | 7/1994 | Stanisci |
| 5,375,076 | A | 12/1994 | Goodrich et al. |
| 5,480,118 | A | 1/1996 | Cross |
| 5,546,271 | A | 8/1996 | Gut et al. |
| 5,548,477 | A | 8/1996 | Kumar et al. |
| 5,558,577 | A | 9/1996 | Kato |
| 5,666,694 | A * | 9/1997 | Slow ................ G06F 1/1618 16/308 |
| 5,681,220 | A | 10/1997 | Bertram et al. |
| 5,737,183 | A | 4/1998 | Kobayashi et al. |
| 5,745,376 | A | 4/1998 | Barker et al. |
| 5,748,114 | A | 5/1998 | Koehn |
| 5,771,540 | A | 6/1998 | Carpenter et al. |
| 5,781,406 | A | 7/1998 | Hunte |
| 5,807,175 | A | 9/1998 | Davis et al. |
| 5,818,361 | A | 10/1998 | Acevedo |
| 5,828,770 | A | 10/1998 | Leis et al. |
| 5,842,027 | A | 11/1998 | Oprescu et al. |
| 5,861,990 | A | 1/1999 | Tedesco |
| 5,874,697 | A | 2/1999 | Selker et al. |
| 5,905,485 | A | 5/1999 | Podoloff |
| 5,926,170 | A | 7/1999 | Oba |
| 5,971,635 | A | 10/1999 | Wise |
| 6,002,389 | A | 12/1999 | Kasser |
| 6,005,209 | A | 12/1999 | Burleson et al. |
| 6,012,714 | A | 1/2000 | Worley et al. |
| 6,040,823 | A | 3/2000 | Seffernick et al. |
| 6,044,717 | A | 4/2000 | Biegelsen et al. |
| 6,061,644 | A | 5/2000 | Leis |
| 6,108,200 | A | 8/2000 | Fullerton |
| 6,112,797 | A | 9/2000 | Colson et al. |
| 6,128,007 | A | 10/2000 | Seybold |
| 6,141,388 | A | 10/2000 | Servais et al. |
| 6,178,443 | B1 | 1/2001 | Lin |
| 6,233,138 | B1 | 5/2001 | Osgood |
| 6,254,105 | B1 | 7/2001 | Rinde et al. |
| 6,279,060 | B1 | 8/2001 | Luke et al. |
| 6,292,981 | B1 | 9/2001 | Ford et al. |
| 6,329,617 | B1 | 12/2001 | Burgess |
| 6,341,407 | B1 | 1/2002 | Hayashida |
| 6,344,791 | B1 | 2/2002 | Armstrong |
| 6,366,440 | B1 | 4/2002 | Kung |
| 6,380,497 | B1 | 4/2002 | Hashimoto et al. |
| 6,437,682 | B1 | 8/2002 | Vance |
| 6,511,378 | B1 | 1/2003 | Bhatt et al. |
| 6,532,147 | B1 | 3/2003 | Christ, Jr. |
| 6,543,949 | B1 | 4/2003 | Ritchey et al. |
| 6,553,625 | B2 | 4/2003 | Lin et al. |
| 6,565,439 | B2 | 5/2003 | Shinohara et al. |
| 6,597,347 | B1 | 7/2003 | Yasutake |
| 6,600,121 | B1 | 7/2003 | Olodort et al. |
| 6,603,408 | B1 | 8/2003 | Gaba |
| 6,608,664 | B1 | 8/2003 | Hasegawa |
| 6,617,536 | B2 | 9/2003 | Kawaguchi |
| 6,651,943 | B2 | 11/2003 | Cho et al. |
| 6,685,369 | B2 | 2/2004 | Lien |
| 6,695,273 | B2 | 2/2004 | Iguchi |
| 6,704,864 | B1 | 3/2004 | Philyaw |
| 6,721,019 | B2 | 4/2004 | Kono et al. |
| 6,725,318 | B1 | 4/2004 | Sherman et al. |
| 6,774,888 | B1 | 8/2004 | Genduso |
| 6,776,546 | B2 | 8/2004 | Kraus et al. |
| 6,781,819 | B2 | 8/2004 | Yang et al. |
| 6,784,869 | B1 | 8/2004 | Clark et al. |
| 6,813,143 | B2 | 11/2004 | Makela |
| 6,819,316 | B2 | 11/2004 | Schulz et al. |
| 6,856,506 | B2 | 2/2005 | Doherty et al. |
| 6,856,789 | B2 | 2/2005 | Pattabiraman et al. |
| 6,861,961 | B2 | 3/2005 | Sandbach et al. |
| 6,914,197 | B2 | 7/2005 | Doherty et al. |
| 6,950,950 | B2 | 9/2005 | Sawyers et al. |
| 6,970,957 | B1 | 11/2005 | Oshins et al. |
| 6,976,799 | B2 | 12/2005 | Kim et al. |
| 7,007,238 | B2 | 2/2006 | Glaser |
| 7,051,149 | B2 | 5/2006 | Wang et al. |
| 7,079,874 | B2 | 7/2006 | Pontoppidan et al. |
| 7,083,295 | B1 | 8/2006 | Hanna |
| 7,091,436 | B2 | 8/2006 | Serban |
| 7,099,149 | B2 | 8/2006 | Krieger et al. |
| 7,106,222 | B2 | 9/2006 | Ward et al. |
| 7,123,292 | B1 | 10/2006 | Seeger et al. |
| 7,152,985 | B2 | 12/2006 | Benitez et al. |
| D535,292 | S | 1/2007 | Shi et al. |
| 7,192,105 | B2 | 3/2007 | Jung |
| 7,194,662 | B2 | 3/2007 | Do et al. |
| 7,213,991 | B2 | 5/2007 | Chapman et al. |
| 7,239,505 | B2 * | 7/2007 | Keely ................ G06F 1/1616 361/679.09 |
| 7,260,221 | B1 | 8/2007 | Atsmon |
| 7,277,087 | B2 | 10/2007 | Hill et al. |
| 7,301,759 | B2 | 11/2007 | Hsiung |
| 7,447,934 | B2 | 11/2008 | Dasari et al. |
| 7,469,386 | B2 | 12/2008 | Bear et al. |
| 7,486,165 | B2 | 2/2009 | Ligtenberg et al. |
| 7,499,037 | B2 | 3/2009 | Lube |
| 7,502,803 | B2 | 3/2009 | Culter et al. |
| 7,542,052 | B2 | 6/2009 | Solomon et al. |
| 7,558,594 | B2 | 7/2009 | Wilson |
| 7,559,834 | B1 | 7/2009 | York |
| RE40,891 | E | 9/2009 | Yasutake |
| 7,636,921 | B2 | 12/2009 | Louie |
| 7,639,876 | B2 | 12/2009 | Clary et al. |
| 7,656,392 | B2 | 2/2010 | Bolender |
| 7,729,493 | B2 | 6/2010 | Krieger et al. |
| 7,731,147 | B2 | 6/2010 | Rha |
| 7,733,326 | B1 | 6/2010 | Adiseshan |
| 7,761,119 | B2 | 7/2010 | Patel |
| 7,777,972 | B1 | 8/2010 | Chen et al. |
| 7,782,342 | B2 | 8/2010 | Koh |
| 7,813,715 | B2 | 10/2010 | McKillop et al. |
| 7,822,338 | B2 | 10/2010 | Wernersson |
| 7,865,639 | B2 | 1/2011 | McCoy et al. |
| 7,884,807 | B2 | 2/2011 | Hovden et al. |
| 7,913,357 | B2 | 3/2011 | Peng et al. |
| D636,397 | S | 4/2011 | Green |
| 7,928,964 | B2 | 4/2011 | Kolmykov-Zotov et al. |
| 7,944,520 | B2 | 5/2011 | Ichioka et al. |
| 7,945,717 | B2 | 5/2011 | Rivalsi |
| 7,967,462 | B2 | 6/2011 | Ogiro et al. |
| 7,973,771 | B2 | 7/2011 | Geaghan |
| 7,978,281 | B2 | 7/2011 | Vergith et al. |
| 8,016,255 | B2 | 9/2011 | Lin |
| 8,018,714 | B2 * | 9/2011 | Luke ................ G06F 1/1616 248/349.1 |
| 8,053,688 | B2 | 11/2011 | Conzola et al. |
| 8,065,624 | B2 | 11/2011 | Morin et al. |
| 8,069,356 | B2 | 11/2011 | Rathi et al. |
| 8,074,956 | B2 | 12/2011 | Wang et al. |
| 8,090,885 | B2 | 1/2012 | Callaghan et al. |
| 8,098,233 | B2 | 1/2012 | Hotelling et al. |
| 8,115,499 | B2 | 2/2012 | Osoinach et al. |
| 8,117,362 | B2 | 2/2012 | Rodriguez et al. |
| 8,118,274 | B2 | 2/2012 | McClure et al. |
| 8,130,203 | B2 | 3/2012 | Westerman |
| 8,154,524 | B2 | 4/2012 | Wilson et al. |
| 8,162,282 | B2 | 4/2012 | Hu et al. |
| D659,139 | S | 5/2012 | Gengler |
| 8,169,421 | B2 | 5/2012 | Wright et al. |
| 8,224,405 | B2 | 7/2012 | Lombardi et al. |
| 8,229,509 | B2 | 7/2012 | Paek et al. |

(56) References Cited

U.S. PATENT DOCUMENTS

| | | |
|---|---|---|
| 8,229,522 B2 | 7/2012 | Kim et al. |
| 8,230,992 B2 | 7/2012 | Law et al. |
| 8,231,099 B2 | 7/2012 | Chen |
| 8,248,791 B2 | 8/2012 | Wang et al. |
| 8,255,708 B1 | 8/2012 | Zhang |
| 8,264,310 B2 | 9/2012 | Lauder et al. |
| 8,267,368 B2 | 9/2012 | Torii et al. |
| 8,274,784 B2 | 9/2012 | Franz et al. |
| 8,279,589 B2 | 10/2012 | Kim |
| 8,322,290 B1 | 12/2012 | Mignano |
| 8,387,078 B2 | 2/2013 | Memmott |
| 8,403,288 B2 | 3/2013 | Cheng |
| 8,416,559 B2 | 4/2013 | Agata et al. |
| 8,498,100 B1 | 7/2013 | Whitt, III et al. |
| 8,514,568 B2 | 8/2013 | Qiao et al. |
| 8,523,131 B2 | 9/2013 | Derry et al. |
| 8,543,227 B1 | 9/2013 | Perek et al. |
| 8,548,608 B2 | 10/2013 | Perek et al. |
| 8,564,944 B2 | 10/2013 | Whitt, III et al. |
| 8,570,725 B2 | 10/2013 | Whitt, III et al. |
| 8,599,542 B1 | 12/2013 | Healey et al. |
| 8,610,015 B2 | 12/2013 | Whitt, III et al. |
| 8,614,666 B2 | 12/2013 | Whitman et al. |
| 8,646,999 B2 | 2/2014 | Shaw et al. |
| 8,699,215 B2 | 4/2014 | Whitt, III et al. |
| 8,719,603 B2 | 5/2014 | Belesiu |
| 8,724,302 B2 | 5/2014 | Whitt et al. |
| 8,744,391 B2 | 6/2014 | Tenbrook et al. |
| 9,310,848 B2 | 4/2016 | Fujino et al. |
| 9,447,620 B2 | 9/2016 | Park et al. |
| 2002/0044216 A1 | 4/2002 | Cha |
| 2002/0134828 A1 | 9/2002 | Sandbach et al. |
| 2003/0163611 A1 | 8/2003 | Nagao |
| 2003/0197687 A1 | 10/2003 | Shetter |
| 2003/0222848 A1 | 12/2003 | Solomon et al. |
| 2004/0056843 A1 | 3/2004 | Lin et al. |
| 2004/0156168 A1 | 8/2004 | LeVasseur et al. |
| 2004/0212601 A1 | 10/2004 | Cake et al. |
| 2004/0258924 A1 | 12/2004 | Berger et al. |
| 2004/0268000 A1 | 12/2004 | Barker et al. |
| 2005/0030728 A1 | 2/2005 | Kawashima et al. |
| 2005/0052831 A1 | 3/2005 | Chen |
| 2005/0055498 A1 | 3/2005 | Beckert et al. |
| 2005/0057515 A1 | 3/2005 | Bathiche |
| 2005/0059489 A1 | 3/2005 | Kim |
| 2005/0099400 A1 | 5/2005 | Lee |
| 2005/0134717 A1 | 6/2005 | Misawa |
| 2005/0146512 A1 | 7/2005 | Hill et al. |
| 2005/0264653 A1 | 12/2005 | Starkweather et al. |
| 2005/0264988 A1 | 12/2005 | Nicolosi |
| 2006/0085658 A1 | 4/2006 | Allen et al. |
| 2006/0125799 A1 | 6/2006 | Hillis et al. |
| 2006/0154725 A1 | 7/2006 | Glaser et al. |
| 2006/0156415 A1 | 7/2006 | Rubinstein et al. |
| 2006/0181514 A1 | 8/2006 | Newman |
| 2006/0187216 A1 | 8/2006 | Trent, Jr. et al. |
| 2006/0195522 A1 | 8/2006 | Miyazaki |
| 2006/0227393 A1 | 10/2006 | Herloski |
| 2006/0272128 A1 | 12/2006 | Rude |
| 2007/0003267 A1 | 1/2007 | Shibutani |
| 2007/0056385 A1 | 3/2007 | Lorenz |
| 2007/0062089 A1 | 3/2007 | Homer et al. |
| 2007/0069153 A1 | 3/2007 | Pai-Paranjape et al. |
| 2007/0072474 A1 | 3/2007 | Beasley et al. |
| 2007/0145945 A1 | 6/2007 | McGinley et al. |
| 2007/0164191 A1 | 7/2007 | Kim |
| 2007/0176902 A1 | 8/2007 | Newman et al. |
| 2007/0182663 A1 | 8/2007 | Biech |
| 2007/0182722 A1 | 8/2007 | Hotelling et al. |
| 2007/0185590 A1 | 8/2007 | Reindel et al. |
| 2007/0200830 A1 | 8/2007 | Yamamoto |
| 2007/0220708 A1 | 9/2007 | Lewis |
| 2007/0234420 A1 | 10/2007 | Novotney et al. |
| 2007/0236408 A1 | 10/2007 | Yamaguchi et al. |
| 2007/0236475 A1 | 10/2007 | Wherry |
| 2007/0236873 A1 | 10/2007 | Yukawa et al. |
| 2007/0247432 A1 | 10/2007 | Oakley |
| 2007/0260892 A1 | 11/2007 | Paul et al. |
| 2007/0283179 A1 | 12/2007 | Burnett et al. |
| 2008/0005423 A1 | 1/2008 | Jacobs et al. |
| 2008/0053222 A1 | 3/2008 | Ehrensvard et al. |
| 2008/0059888 A1 | 3/2008 | Dunko |
| 2008/0104437 A1 | 5/2008 | Lee |
| 2008/0151478 A1 | 6/2008 | Chern |
| 2008/0158185 A1 | 7/2008 | Westerman |
| 2008/0174570 A1 | 7/2008 | Jobs et al. |
| 2008/0186660 A1 | 8/2008 | Yang |
| 2008/0228969 A1 | 9/2008 | Cheah et al. |
| 2008/0238884 A1 | 10/2008 | Harish |
| 2008/0253822 A1 | 10/2008 | Matias |
| 2008/0309636 A1 | 12/2008 | Feng et al. |
| 2008/0316002 A1 | 12/2008 | Brunet et al. |
| 2008/0320190 A1 | 12/2008 | Lydon et al. |
| 2009/0009476 A1 | 1/2009 | Daley, III |
| 2009/0073957 A1 | 3/2009 | Newland et al. |
| 2009/0083562 A1 | 3/2009 | Park et al. |
| 2009/0140985 A1 | 6/2009 | Liu |
| 2009/0195497 A1 | 8/2009 | Fitzgerald et al. |
| 2009/0231275 A1 | 9/2009 | Odgers |
| 2009/0251008 A1 | 10/2009 | Sugaya |
| 2009/0259865 A1 | 10/2009 | Sheynblat et al. |
| 2009/0262492 A1 | 10/2009 | Whitchurch et al. |
| 2009/0265670 A1 | 10/2009 | Kim et al. |
| 2009/0285491 A1 | 11/2009 | Ravenscroft et al. |
| 2009/0296331 A1 | 12/2009 | Choy |
| 2009/0303204 A1 | 12/2009 | Nasiri et al. |
| 2009/0320244 A1 | 12/2009 | Lin |
| 2009/0321490 A1 | 12/2009 | Groene et al. |
| 2010/0001963 A1 | 1/2010 | Doray et al. |
| 2010/0013319 A1 | 1/2010 | Kamiyama et al. |
| 2010/0026656 A1 | 2/2010 | Hotelling et al. |
| 2010/0038821 A1 | 2/2010 | Jenkins et al. |
| 2010/0045633 A1 | 2/2010 | Gettemy |
| 2010/0051432 A1 | 3/2010 | Lin et al. |
| 2010/0053534 A1 | 3/2010 | Hsieh et al. |
| 2010/0072334 A1 | 3/2010 | Le Gette et al. |
| 2010/0077237 A1 | 3/2010 | Sawyers |
| 2010/0085321 A1 | 4/2010 | Pundsack |
| 2010/0102182 A1 | 4/2010 | Lin |
| 2010/0103112 A1 | 4/2010 | Yoo et al. |
| 2010/0123686 A1 | 5/2010 | Klinghult et al. |
| 2010/0133398 A1 | 6/2010 | Chiu et al. |
| 2010/0133414 A1 | 6/2010 | Lee et al. |
| 2010/0142130 A1 | 6/2010 | Wang et al. |
| 2010/0149111 A1 | 6/2010 | Olien |
| 2010/0149377 A1 | 6/2010 | Shintani et al. |
| 2010/0154171 A1 | 6/2010 | Lombardi et al. |
| 2010/0161522 A1 | 6/2010 | Tirpak et al. |
| 2010/0164857 A1 | 7/2010 | Liu et al. |
| 2010/0164897 A1 | 7/2010 | Morin et al. |
| 2010/0171891 A1 | 7/2010 | Kaji et al. |
| 2010/0174421 A1 | 7/2010 | Tsai et al. |
| 2010/0180063 A1 | 7/2010 | Ananny et al. |
| 2010/0188299 A1 | 7/2010 | Rinehart et al. |
| 2010/0206614 A1 | 8/2010 | Park et al. |
| 2010/0222110 A1 | 9/2010 | Kim et al. |
| 2010/0231556 A1 | 9/2010 | Mines et al. |
| 2010/0235546 A1 | 9/2010 | Terlizzi et al. |
| 2010/0238620 A1 | 9/2010 | Fish |
| 2010/0250988 A1 | 9/2010 | Okuda et al. |
| 2010/0271771 A1 | 10/2010 | Wu et al. |
| 2010/0274932 A1 | 10/2010 | Kose |
| 2010/0279768 A1 | 11/2010 | Huang et al. |
| 2010/0289457 A1 | 11/2010 | Onnerud et al. |
| 2010/0295812 A1 | 11/2010 | Burns et al. |
| 2010/0302378 A1 | 12/2010 | Marks et al. |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315348 A1 | 12/2010 | Jellicoe et al. |
| 2010/0321877 A1 | 12/2010 | Moser |
| 2010/0324457 A1 | 12/2010 | Bean et al. |
| 2010/0325155 A1 | 12/2010 | Skinner et al. |
| 2011/0012873 A1 | 1/2011 | Prest et al. |

(56) References Cited

U.S. PATENT DOCUMENTS

| | | |
|---|---|---|
| 2011/0019123 A1 | 1/2011 | Prest et al. |
| 2011/0025176 A1 | 2/2011 | McClure et al. |
| 2011/0031287 A1 | 2/2011 | Le Gette et al. |
| 2011/0036965 A1 | 2/2011 | Zhang et al. |
| 2011/0037721 A1 | 2/2011 | Cranfill et al. |
| 2011/0043990 A1 | 2/2011 | Mickey et al. |
| 2011/0055407 A1 | 3/2011 | Lydon et al. |
| 2011/0060926 A1 | 3/2011 | Brooks et al. |
| 2011/0069148 A1 | 3/2011 | Jones et al. |
| 2011/0074688 A1 | 3/2011 | Hull et al. |
| 2011/0102326 A1 | 5/2011 | Casparian et al. |
| 2011/0115713 A1 | 5/2011 | Altman et al. |
| 2011/0134032 A1 | 6/2011 | Chiu et al. |
| 2011/0149510 A1 | 6/2011 | Monsalve et al. |
| 2011/0157046 A1 | 6/2011 | Lee et al. |
| 2011/0157087 A1 | 6/2011 | Kanehira et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0169762 A1 | 7/2011 | Weiss |
| 2011/0170289 A1 | 7/2011 | Allen et al. |
| 2011/0176035 A1 | 7/2011 | Poulsen |
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0205372 A1 | 8/2011 | Miramontes |
| 2011/0227913 A1 | 9/2011 | Hyndman |
| 2011/0231682 A1 | 9/2011 | Kakish et al. |
| 2011/0248152 A1 | 10/2011 | Svajda et al. |
| 2011/0248920 A1 | 10/2011 | Larsen |
| 2011/0261001 A1 | 10/2011 | Liu |
| 2011/0267272 A1 | 11/2011 | Meyer et al. |
| 2011/0290686 A1 | 12/2011 | Huang |
| 2011/0295697 A1 | 12/2011 | Boston et al. |
| 2011/0297566 A1 | 12/2011 | Gallagher et al. |
| 2011/0298919 A1 | 12/2011 | Maglaque |
| 2011/0304577 A1 | 12/2011 | Brown |
| 2011/0316807 A1 | 12/2011 | Corrion |
| 2012/0007821 A1 | 1/2012 | Zaliva |
| 2012/0023459 A1 | 1/2012 | Westerman |
| 2012/0024682 A1 | 2/2012 | Huang et al. |
| 2012/0032891 A1 | 2/2012 | Parivar |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0068919 A1 | 3/2012 | Lauder et al. |
| 2012/0069540 A1 | 3/2012 | Lauder et al. |
| 2012/0075249 A1 | 3/2012 | Hoch |
| 2012/0092279 A1 | 4/2012 | Martin |
| 2012/0094257 A1 | 4/2012 | Pillischer et al. |
| 2012/0099749 A1 | 4/2012 | Rubin et al. |
| 2012/0113579 A1 | 5/2012 | Agata et al. |
| 2012/0117409 A1 | 5/2012 | Lee et al. |
| 2012/0127118 A1 | 5/2012 | Nolting et al. |
| 2012/0140396 A1 | 6/2012 | Zeliff et al. |
| 2012/0145525 A1 | 6/2012 | Ishikawa |
| 2012/0161406 A1 | 6/2012 | Mersky |
| 2012/0162693 A1 | 6/2012 | Ito |
| 2012/0175487 A1 | 7/2012 | Goto |
| 2012/0176741 A1 | 7/2012 | Wu et al. |
| 2012/0182242 A1 | 7/2012 | Lindahl et al. |
| 2012/0182743 A1 | 7/2012 | Chou |
| 2012/0194448 A1 | 8/2012 | Rothkopf |
| 2012/0194972 A1 | 8/2012 | Bohn et al. |
| 2012/0215284 A1 | 8/2012 | Berg et al. |
| 2012/0224073 A1 | 9/2012 | Miyahara |
| 2012/0229634 A1 | 9/2012 | Laett et al. |
| 2012/0246377 A1 | 9/2012 | Bhesania |
| 2012/0249443 A1 | 10/2012 | Anderson et al. |
| 2012/0256959 A1 | 10/2012 | Ye et al. |
| 2012/0274811 A1 | 11/2012 | Bakin |
| 2012/0300275 A1 | 11/2012 | Vilardell et al. |
| 2012/0312955 A1 | 12/2012 | Randolph |
| 2012/0326003 A1 | 12/2012 | Solow et al. |
| 2013/0009413 A1 | 1/2013 | Chiu et al. |
| 2013/0027867 A1 | 1/2013 | Lauder et al. |
| 2013/0044074 A1 | 2/2013 | Park et al. |
| 2013/0063873 A1 | 3/2013 | Wodrich et al. |
| 2013/0067126 A1 | 3/2013 | Casparian et al. |
| 2013/0076617 A1 | 3/2013 | Csaszar et al. |
| 2013/0088431 A1 | 4/2013 | Ballagas et al. |
| 2013/0100597 A1 | 4/2013 | Berg et al. |
| 2013/0106766 A1 | 5/2013 | Yilmaz et al. |
| 2013/0162554 A1 | 6/2013 | Lauder et al. |
| 2013/0172906 A1 | 7/2013 | Olson et al. |
| 2013/0175421 A1 | 7/2013 | Faulk et al. |
| 2013/0193292 A1 | 8/2013 | Hsu et al. |
| 2013/0217451 A1 | 8/2013 | Komiyama et al. |
| 2013/0227836 A1 | 9/2013 | Whitt, III et al. |
| 2013/0228023 A1 | 9/2013 | Drasnin et al. |
| 2013/0228433 A1 | 9/2013 | Shaw et al. |
| 2013/0228434 A1 | 9/2013 | Whitt, III et al. |
| 2013/0228439 A1 | 9/2013 | Whitt, III et al. |
| 2013/0229100 A1 | 9/2013 | Siddiqui et al. |
| 2013/0229335 A1 | 9/2013 | Whitman et al. |
| 2013/0229347 A1 | 9/2013 | Lutz, III et al. |
| 2013/0229350 A1 | 9/2013 | Shaw et al. |
| 2013/0229351 A1 | 9/2013 | Whitt, III et al. |
| 2013/0229354 A1 | 9/2013 | Whitt, III et al. |
| 2013/0229363 A1 | 9/2013 | Whitman et al. |
| 2013/0229366 A1 | 9/2013 | Dighde et al. |
| 2013/0229380 A1 | 9/2013 | Lutz, III et al. |
| 2013/0229534 A1 | 9/2013 | Panay et al. |
| 2013/0229568 A1 | 9/2013 | Belesiu et al. |
| 2013/0229570 A1 | 9/2013 | Beck et al. |
| 2013/0229756 A1 | 9/2013 | Whitt, III et al. |
| 2013/0229757 A1 | 9/2013 | Whitt, III et al. |
| 2013/0229758 A1 | 9/2013 | Belesiu et al. |
| 2013/0229759 A1 | 9/2013 | Whitt, III et al. |
| 2013/0229760 A1 | 9/2013 | Whitt, III |
| 2013/0229761 A1 | 9/2013 | Shaw |
| 2013/0229762 A1 | 9/2013 | Whitt, III |
| 2013/0229773 A1 | 9/2013 | Siddiqui et al. |
| 2013/0230346 A1 | 9/2013 | Shaw |
| 2013/0231755 A1 | 9/2013 | Perek |
| 2013/0232280 A1 | 9/2013 | Perek |
| 2013/0232348 A1 | 9/2013 | Oler |
| 2013/0232349 A1 | 9/2013 | Oler et al. |
| 2013/0232350 A1 | 9/2013 | Belesiu et al. |
| 2013/0232353 A1 | 9/2013 | Belesiu |
| 2013/0232571 A1 | 9/2013 | Belesiu |
| 2013/0262886 A1 | 10/2013 | Nishimura |
| 2013/0300590 A1 | 11/2013 | Dietz |
| 2013/0300647 A1 | 11/2013 | Drasnin |
| 2013/0301199 A1 | 11/2013 | Whitt |
| 2013/0301206 A1 | 11/2013 | Whitt |
| 2013/0304941 A1 | 11/2013 | Drasnin |
| 2013/0322000 A1 | 12/2013 | Whitt |
| 2013/0322001 A1 | 12/2013 | Whitt |
| 2013/0329360 A1 | 12/2013 | Aldana |
| 2013/0332628 A1 | 12/2013 | Panay |
| 2013/0335891 A1 | 12/2013 | Chen et al. |
| 2013/0339757 A1 | 12/2013 | Reddy |
| 2014/0012401 A1 | 1/2014 | Perek et al. |
| 2014/0021727 A1 | 1/2014 | Mai et al. |
| 2014/0029180 A1 | 1/2014 | Nishimura et al. |
| 2014/0036429 A1 | 2/2014 | Bryan et al. |
| 2014/0036430 A1 | 2/2014 | Wroblewski et al. |
| 2014/0043275 A1 | 2/2014 | Whitman |
| 2014/0047672 A1 | 2/2014 | Saito et al. |
| 2014/0048399 A1 | 2/2014 | Whitt, III |
| 2014/0076748 A1 | 3/2014 | Padilla et al. |
| 2014/0083883 A1 | 3/2014 | Elias |
| 2014/0119802 A1 | 5/2014 | Shaw |
| 2014/0132550 A1 | 5/2014 | McCracken et al. |
| 2014/0174960 A1 | 6/2014 | Zho |
| 2014/0263939 A1 | 9/2014 | Rinner |
| 2014/0293534 A1 | 10/2014 | Siddiqui |
| 2014/0317882 A1 | 10/2014 | Chen et al. |
| 2014/0376179 A1 | 12/2014 | Jenkins et al. |
| 2015/0092335 A1 | 4/2015 | Patrick et al. |
| 2015/0212553 A1 | 7/2015 | Park et al. |

(56) References Cited

U.S. PATENT DOCUMENTS

| | | | |
|---|---|---|---|
| 2015/0342067 | A1 | 11/2015 | Gault et al. |
| 2015/0362962 | A1 | 12/2015 | Lee et al. |
| 2016/0090767 | A1 | 3/2016 | Park et al. |
| 2017/0068284 | A1 | 3/2017 | Park et al. |

FOREIGN PATENT DOCUMENTS

| | | |
|---|---|---|
| CN | 103455149 | 12/2013 |
| DE | 202010005274 | 7/2010 |
| EP | 1223722 | 7/2002 |
| EP | 1591891 | 11/2005 |
| EP | 2353978 | 8/2011 |
| GB | 2123213 | 1/1984 |
| JP | 56108127 | 8/1981 |
| JP | 10326124 | 12/1998 |
| JP | 1173239 | 3/1999 |
| JP | 2006294361 | 10/2006 |
| KR | 1020110087178 | 8/2011 |
| WO | WO 9845769 | 10/1998 |
| WO | WO 9919995 | 4/1999 |
| WO | WO 2005064436 | 7/2005 |
| WO | WO 2006044818 | 4/2006 |
| WO | WO 2009034484 | 3/2009 |

OTHER PUBLICATIONS

"ACPI Docking for Windows Operating Systems", Retrieved from: <http://www.scritube.com/limba/engleza/software/ACPI-Docking-for-Windows-Opera331824193.php> on Jul. 6, 2012, 2012, 10 pages.

"Adjustable Kickstand for SecureBack™ M Series Enclosures", Retrieved From: <http://www.kensington.com/ce/ca/4543/8589667786/adjustable-kickstand-for-secureback™-m-series-enclosures#.VQ_Z7_mUdT5> Mar. 25, 2015, 2012, 3 pages.

"Advanced Configuration and Power Management Specification", Intel Corporation, Microsoft Corporation, Toshiba Corp. Revision 1, Dec. 22, 1996, 364 pages.

"Advisory Action", U.S. Appl. No. 13/939,032, Feb. 24, 2014, 2 pages.

"Advisory Action", U.S. Appl. No. 14/199,924, May 28, 2014, 2 pages.

"Basic Cam Motion Curves", Retrieved From: <http://ocw.metu.edu.tr/pluginfile.php/6886/mod_resource/content/1/ch8/8-3.htm> Nov. 22, 2013, Middle East Technical University, 1999, 14 Pages.

"Cholesteric Liquid Crystal", Retrieved from: <http://en.wikipedia.org/wiki/Cholesteric_liquid_crystal> on Aug. 6, 2012, Jun. 10, 2012, 2 pages.

"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, Jan. 2013, 1 page.

"Corrected Notice of Allowance", U.S. Appl. No. 13/470,633, Apr. 9, 2013, 2 pages.

"Corrected Notice of Allowance", U.S. Appl. No. 13/470,633, Jul. 2, 2013, 2 pages.

"Corrected Notice of Allowance", U.S. Appl. No. 13/563,435, Jan. 14, 2014, 2 pages.

"Corrected Notice of Allowance", U.S. Appl. No. 13/563,435, Mar. 20, 2014, 2 pages.

"Corrected Notice of Allowance", U.S. Appl. No. 13/563,435, Jan. 22, 2014, 2 pages.

"Corrected Notice of Allowance", U.S. Appl. No. 13/565,124, Apr. 3, 2014, 4 pages.

"Corrected Notice of Allowance", U.S. Appl. No. 13/565,124, Mar. 10, 2014, 2 pages.

"Corrected Notice of Allowance", U.S. Appl. No. 13/565,124, Apr. 14, 2014, 2 pages.

"Corrected Notice of Allowance", U.S. Appl. No. 13/651,327, Sep. 12, 2013, 2 pages.

"Corrected Notice of Allowance", U.S. Appl. No. 13/651,327, Sep. 23, 2013, 2 pages.

"Corrected Notice of Allowance", U.S. Appl. No. 13/651,726, Sep. 17, 2013, 2 pages.

"Corrected Notice of Allowance", U.S. Appl. No. 13/938,930, May 6, 2014, 2 pages.

"Corrected Notice of Allowance", U.S. Appl. No. 13/938,930, Jun. 6, 2014, 2 pages.

"Corrected Notice of Allowance", U.S. Appl. No. 13/939,002, May 22, 2014, 2 pages.

"Corrected Notice of Allowance", U.S. Appl. No. 13/939,002, May 5, 2014, 2 pages.

"DR2PA", retrieved from <http://www.architainment.co.uk/wp-content/uploads/2012/08/DR2PA-AU-US-size-Data-Sheet-Rev-H_LOGO.pdf> on Sep. 17, 2012, Jan. 2012, 4 pages.

"Final Office Action", U.S. Appl. No. 13/471,001, Jul. 25, 2013, 20 pages.

"Final Office Action", U.S. Appl. No. 13/471,139, Sep. 16, 2013, 13 pages.

"Final Office Action", U.S. Appl. No. 13/471,336, Aug. 28, 2013, 18 pages.

"Final Office Action", U.S. Appl. No. 13/564,520, Jan. 15, 2014, 7 pages.

"Final Office Action", U.S. Appl. No. 13/651,195, Apr. 18, 2013, 13 pages.

"Final Office Action", U.S. Appl. No. 13/651,232, May 21, 2013, 21 pages.

"Final Office Action", U.S. Appl. No. 13/651,287, May 3, 2013, 16 pages.

"Final Office Action", U.S. Appl. No. 13/651,976, Jul. 25, 2013, 21 pages.

"Final Office Action", U.S. Appl. No. 13/653,321, Aug. 2, 2013, 17 pages.

"Final Office Action", U.S. Appl. No. 13/653,682, Jun. 11, 2014, 11 pages.

"Final Office Action", U.S. Appl. No. 13/653,682, Oct. 18, 2013, 16 pages.

"Final Office Action", U.S. Appl. No. 13/656,055, Oct. 23, 2013, 14 pages.

"Final Office Action", U.S. Appl. No. 13/780,228, Mar. 28, 2014, 13 pages.

"Final Office Action", U.S. Appl. No. 13/938,930, Nov. 8, 2013, 10 pages.

"Final Office Action", U.S. Appl. No. 13/939,002, Nov. 8, 2013, 7 pages.

"Final Office Action", U.S. Appl. No. 13/939,032, Dec. 20, 2013, 5 pages.

"Final Office Action", U.S. Appl. No. 14/063,912, Apr. 29, 2014, 10 pages.

"Final Office Action", U.S. Appl. No. 14/199,924, May 6, 2014, 5 pages.

"FingerWorks Installation and Operation Guide for the TouchStream ST and TouchStream LP", FingerWorks, Inc. Retrieved from <http://ec1.images-amazon.com/media/i3d/01/a/man-migrate/MANUAL000049862.pdf>, 2002, 14 pages.

"First One Handed Fabric Keyboard with Bluetooth Wireless Technology", Retrieved from: <http://press.xtvworld.com/article3817.html> on May 8, 2012, Jan. 6, 2005, 2 pages.

"Force and Position Sensing Resistors: An Emerging Technology", Interlink Electronics, Available at <http://staff.science.uva.nl/~vlaander/docu/FSR/An_Exploring_Technology.pdf>, Feb. 1990, pp. 1-6.

"Foreign Office Action", CN Application No. 201320097066.8, Oct. 24, 2013, 5 Pages.

"Foreign Office Action", CN Application No. 201320328022.1, Feb. 17, 2014, 4 Pages.

"Foreign Office Action", CN Application No. 201320328022.1, Oct. 18, 2013, 3 Pages.

"Frogpad Introduces Weareable Fabric Keyboard with Bluetooth Technology", Retrieved from: <http://www.geekzone.co.nz/content.asp?contentid=3898> on May 7, 2012, Jan. 7, 2005, 3 pages.

(56) References Cited

OTHER PUBLICATIONS

"i-Blason Spring Series Premium Flexible KickStand Anti-Slippery TPU Cover Case for iPhone 4 4S (White)", Retrieved From: <http://www.amazon.com/i-Blason-Premium-Flexible-KickStand-Anti-Slippery/dp/B007LCLXLU> Jun. 12, 2014, Nov. 30, 2012, 4 Pages.

"i-Interactor electronic pen", Retrieved from: <http://www.alibaba.com/product-gs/331004878/i_Interactor_electronic_pen.html> on Jun. 19, 2012, 2012, 5 pages.

"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 2012, 4 pages.

"International Search Report and Written Opinion", Application No. PCT/US2014/031531, Jun. 20, 2014, 10 Pages.

"International Search Report and Written Opinion", Application No. PCT/US2013/028948, Jun. 21, 2013, 11 pages.

"International Search Report and Written Opinion", Application No. PCT/US2013/029461, Jun. 21, 2013, 11 pages.

"International Search Report and Written Opinion", Application No. PCT/US2013/040968, Sep. 5, 2013, 11 pages.

"International Search Report and Written Opinion", Application No. PCT/US2013/042550, Sep. 24, 2013, 14 pages.

"Membrane Keyboards & Membrane Keypads", Retrieved from: <http://www.pannam.com/> on May 9, 2012, Mar. 4, 2009, 2 pages.

"Motion Sensors", Android Developers—retrieved from <http://developer.android.com/guide/topics/sensors/sensors_motion.html> on May 25, 2012, 2012, 7 pages.

"MPC Fly Music Production Controller", AKAI Professional, Retrieved from: <http://www.akaiprompc.com/mpc-fly> on Jul. 9, 2012, 4 pages.

"New Friction Hinge for iPad Flip Stands", Retrieved From: http://www.nclosures.com/new-friction-hinge-design/, Jun. 18, 2013, 2 Pages.

"NI Releases New Maschine & Maschine Mikro", Retrieved from <http://www.djbooth.net/index/dj-equipment/entry/ni-releases-new-maschine-mikro/> on Sep. 17, 2012, 19 pages.

"Non-Final Office Action", U.S. Appl. No. 13/599,635, Feb. 25, 2014, 13 pages.

"Non-Final Office Action", U.S. Appl. No. 13/468,918, Dec. 26, 2013, 18 pages.

"Non-Final Office Action", U.S. Appl. No. 13/471,001, Feb. 19, 2013, 15 pages.

"Non-Final Office Action", U.S. Appl. No. 13/471,001, Jun. 17, 2014, 23 pages.

"Non-Final Office Action", U.S. Appl. No. 13/471,030, May 15, 2014, 10 pages.

"Non-Final Office Action", U.S. Appl. No. 13/471,054, Jun. 3, 2014, 15 pages.

"Non-Final Office Action", U.S. Appl. No. 13/471,139, Mar. 21, 2013, 12 pages.

"Non-Final Office Action", U.S. Appl. No. 13/471,186, Feb. 27, 2014, 8 pages.

"Non-Final Office Action", U.S. Appl. No. 13/471,202, Feb. 11, 2013, 10 pages.

"Non-Final Office Action", U.S. Appl. No. 13/471,237, Mar. 24, 2014, 7 pages.

"Non-Final Office Action", U.S. Appl. No. 13/471,336, Jan. 18, 2013, 14 pages.

"Non-Final Office Action", U.S. Appl. No. 13/471,336, May 7, 2014, 17 pages.

"Non-Final Office Action", U.S. Appl. No. 13/471,376, Apr. 2, 2014, 17 pages.

"Non-Final Office Action", U.S. Appl. No. 13/471,405, Feb. 20, 2014, 37 pages.

"Non-Final Office Action", U.S. Appl. No. 13/492,232, Apr. 30, 2014, 9 pages.

"Non-Final Office Action", U.S. Appl. No. 13/527,263, Apr. 3, 2014, 6 pages.

"Non-Final Office Action", U.S. Appl. No. 13/527,263, Jul. 19, 2013, 5 pages.

"Non-Final Office Action", U.S. Appl. No. 13/563,435, Jun. 14, 2013, 6 pages.

"Non-Final Office Action", U.S. Appl. No. 13/564,520, Feb. 14, 2014, 5 pages.

"Non-Final Office Action", U.S. Appl. No. 13/564,520, Jun. 19, 2013, 8 pages.

"Non-Final Office Action", U.S. Appl. No. 13/564,520, Jun. 16, 2014, 5 pages.

"Non-Final Office Action", U.S. Appl. No. 13/565,124, Jun. 17, 2013, 5 pages.

"Non-Final Office Action", U.S. Appl. No. 13/651,195, Jan. 2, 2013, 14 pages.

"Non-Final Office Action", U.S. Appl. No. 13/651,232, Jan. 17, 2013, 15 pages.

"Non-Final Office Action", U.S. Appl. No. 13/651,232, Dec. 5, 2013, 15 pages.

"Non-Final Office Action", U.S. Appl. No. 13/651,272, Feb. 12, 2013, 10 pages.

"Non-Final Office Action", U.S. Appl. No. 13/651,287, Jan. 29, 2013, 13 pages.

"Non-Final Office Action", U.S. Appl. No. 13/651,304, Mar. 22, 2013, 9 pages.

"Non-Final Office Action", U.S. Appl. No. 13/651,327, Mar. 22, 2013, 6 pages.

"Non-Final Office Action", U.S. Appl. No. 13/651,726, Apr. 15, 2013, 6 pages.

"Non-Final Office Action", U.S. Appl. No. 13/651,871, Mar. 18, 2013, 14 pages.

"Non-Final Office Action", U.S. Appl. No. 13/651,871, Jul. 1, 2013, 5 pages.

"Non-Final Office Action", U.S. Appl. No. 13/651,976, Feb. 22, 2013, 16 pages.

"Non-Final Office Action", U.S. Appl. No. 13/651,976, Jun. 16, 2014, 23 pages.

"Non-Final Office Action", U.S. Appl. No. 13/653,321, Feb. 1, 2013, 13 pages.

"Non-Final Office Action", U.S. Appl. No. 13/653,682, Feb. 7, 2013, 11 pages.

"Non-Final Office Action", U.S. Appl. No. 13/653,682, Feb. 26, 2014, 10 pages.

"Non-Final Office Action", U.S. Appl. No. 13/653,682, Jun. 3, 2013, 14 pages.

"Non-Final Office Action", U.S. Appl. No. 13/656,055, Mar. 12, 2014, 17 pages.

"Non-Final Office Action", U.S. Appl. No. 13/656,055, Apr. 23, 2013, 11 pages.

"Non-Final Office Action", U.S. Appl. No. 13/780,228, Oct. 30, 2013, 12 pages.

"Non-Final Office Action", U.S. Appl. No. 13/938,930, Aug. 29, 2013, 9 pages.

"Non-Final Office Action", U.S. Appl. No. 13/939,002, Aug. 28, 2013, 6 pages.

"Non-Final Office Action", U.S. Appl. No. 13/939,002, Dec. 20, 2013, 5 pages.

"Non-Final Office Action", U.S. Appl. No. 13/939,032, Aug. 29, 2013, 7 pages.

"Non-Final Office Action", U.S. Appl. No. 14/063,912, Jan. 2, 2014, 10 pages.

"Non-Final Office Action", U.S. Appl. No. 14/199,924, Apr. 10, 2014, 6 pages.

"Non-Final Office Action", U.S. Appl. No. 14/200,595, Apr. 11, 2014, 4 pages.

"Non-Final Office Action", U.S. Appl. No. 14/225,250, Jun. 17, 2014, 5 pages.

"Non-Final Office Action", U.S. Appl. No. 14/225,276, Jun. 13, 2014, 6 pages.

"Non-Final Office Action", U.S. Appl. No. 14/277,240, Jun. 13, 2014, 6 pages.

"Non-Final Office Action", U.S. Appl. No. 14/281,905, Jul. 10, 2015, 6 pages.

(56) References Cited

OTHER PUBLICATIONS

"Notice of Allowance", U.S. Appl. No. 13/468,918, Jun. 17, 2014, 5 pages.
"Notice of Allowance", U.S. Appl. No. 13/470,633, Mar. 22, 2013, 7 pages.
"Notice of Allowance", U.S. Appl. No. 13/471,139, Mar. 17, 2014, 4 pages.
"Notice of Allowance", U.S. Appl. No. 13/471,202, May 28, 2013, 7 pages.
"Notice of Allowance", U.S. Appl. No. 13/471,237, May 12, 2014, 8 pages.
"Notice of Allowance", U.S. Appl. No. 13/563,435, Nov. 12, 2013, 5 pages.
"Notice of Allowance", U.S. Appl. No. 13/565,124, Dec. 24, 2013, 6 pages.
"Notice of Allowance", U.S. Appl. No. 13/651,195, Jul. 8, 2013, 9 pages.
"Notice of Allowance", U.S. Appl. No. 13/651,232, Apr. 25, 2014, 9 pages.
"Notice of Allowance", U.S. Appl. No. 13/651,272, May 2, 2013, 7 pages.
"Notice of Allowance", U.S. Appl. No. 13/651,287, May 2, 2014, 6 pages.
"Notice of Allowance", U.S. Appl. No. 13/651,304, Jul. 1, 2013, 5 pages.
"Notice of Allowance", U.S. Appl. No. 13/651,327, Jun. 11, 2013, 7 pages.
"Notice of Allowance", U.S. Appl. No. 13/651,726, May 31, 2013, 5 pages.
"Notice of Allowance", U.S. Appl. No. 13/651,871, Oct. 2, 2013, 7 pages.
"Notice of Allowance", U.S. Appl. No. 13/653,321, Dec. 18, 2013, 4 pages.
"Notice of Allowance", U.S. Appl. No. 13/938,930, Feb. 20, 2014, 4 pages.
"Notice of Allowance", U.S. Appl. No. 13/939,002, Mar. 3, 2014, 4 pages.
"Notice of Allowance", U.S. Appl. No. 13/939,032, Apr. 3, 2014, 4 pages.
"Notice of Allowance", U.S. Appl. No. 14/018,286, May 23, 2014, 8 pages.
"Notice of Allowance", U.S. Appl. No. 14/199,924, Jun. 10, 2014, 4 pages.
"Notice to Grant", CN Application No. 201320097089.9, Sep. 29, 2013, 2 Pages.
"Notice to Grant", CN Application No. 201320097124.7, Oct. 8, 2013, 2 pages.
"Position Sensors", Android Developers—retrieved from <http://developer.android.com/guide/topics/sensors/sensors_position.html> on May 25, 2012, 5 pages.
"Reflex LCD Writing Tablets", retrieved from <http://www.kentdisplays.com/products/lcdwritingtablets.html> on Jun. 27, 2012, 3 pages.
"Restriction Requirement", U.S. Appl. No. 13/468,918, Nov. 29, 2013, 6 pages.
"Restriction Requirement", U.S. Appl. No. 13/471,139, Jan. 17, 2013, 7 pages.
"Restriction Requirement", U.S. Appl. No. 13/595,700, May 28, 2014, 6 pages.
"Restriction Requirement", U.S. Appl. No. 13/651,304, Jan. 18, 2013, 7 pages.
"Restriction Requirement", U.S. Appl. No. 13/651,726, Feb. 22, 2013, 6 pages.
"Restriction Requirement", U.S. Appl. No. 13/651,871, Feb. 7, 2013, 6 pages.
"SMART Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>, 2009, 2 pages.
"SoIRxTM E-Series Multidirectional Phototherapy ExpandableTM 2-Bulb Full Body Panel System", Retrieved from: < http://www.solarcsystems.com/us_multidirectional_uv_light_therapy_1_intro.html > on Jul. 25, 2012, 2011, 4 pages.
"Supplemental Notice of Allowance", U.S. Appl. No. 13/653,321, Mar. 28, 2014, 4 pages.
"Supplemental Notice of Allowance", U.S. Appl. No. 14/018,286, Jun. 11, 2014, 5 pages.
"Teach Me Simply", Retrieved From: <http://techmesimply.blogspot.in/2013/05/yugatech_3.html> on Nov. 22, 2013, May 3, 2013, pp. 1-6.
"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, Jun. 2012, 2 pages.
"The New Lenovo Yoga Tablet 8", Retrieved From:<http://www.pricepanda.co.in/lenovo-yoga-tablet-8-pid1529091/> Jun. 11, 2014, 2014, 2 Pages.
"Tilt Shift Lenses: Perspective Control", retrieved from http://www.cambridgeincolour.com/tutorials/tilt-shift-lenses1.htm, Mar. 28, 2008, 11 Pages.
"Virtualization Getting Started Guide", Red Hat Enterprise Linux 6, Edition 0.2—retrieved from <http://docs.redhat.com/docs/en-US/Red_Hat_Enterprise_Linux/6/html-single/Virtualization_Getting_Started_Guide/index.html> on Jun. 13, 2012, 24 pages.
"Welcome to Windows 7", Retrieved from: <http://www.microsoft.com/en-us/download/confirmation.aspx?id=4984> on Aug. 1, 2013, Sep. 16, 2009, 3 pages.
"What is Active Alignment?", http://www.kasalis.com/active_alignment.html, retrieved on Nov. 22, 2012, Nov. 22, 2012, 2 Pages.
Arar,"HP Envy Rove: A Movable (If Underpowered) All-In-One PC", Retrieved From: <http://www.pcworld.com/article/2047032/hp-envy-rove-a-movable-if-underpowered-all-in-one-pc.html> Jun. 11, 2014, Aug. 21, 2013, 6 Pages.
Block,"DeviceOrientation Event Specification", W3C, Editor's Draft, retrieved from <https://developer.palm.com/content/api/dev-guide/pdk/accessing-device-sensors.html> on May 25, 2012, Jul. 12, 2011, 14 pages.
Brown,"Microsoft Shows Off Pressure-Sensitive Keyboard", retrieved from <http://news.cnet.com/8301-17938_105-10304792-1.html> on May 7, 2012, Aug. 6, 2009, 2 pages.
Butler,"SideSight: Multi-"touch" Interaction around Small Devices", In the proceedings of the 21st annual ACM symposium on User interface software and technology., retrieved from <http://research.microsoft.com/pubs/132534/sidesight_cry3.pdf> on May 29, 2012, Oct. 19, 2008, 4 pages.
Chavan,"Synthesis, Design and Analysis of a Novel Variable Lift Cam Follower System", In Proceedings: International Journal of Design Engineering, vol. 3, Issue 4, Inderscience Publishers, Jun. 3, 2010, 1 Page.
Crider,"Sony Slate Concept Tablet "Grows" a Kickstand", Retrieved from: <http://androidcommunity.com/sony-slate-concept-tablet-grows-a-kickstand-20120116/> on May 4, 2012, Jan. 16, 2012, 9 pages.
Das,"Study of Heat Transfer through Multilayer Clothing Assemblies: A Theoretical Prediction", Retrieved from <http://www.autexrj.com/cms/zalaczone_pliki/5_013_11.pdf>, Jun. 2011, 7 pages.
Dietz,"A Practical Pressure Sensitive Computer Keyboard", In Proceedings of UIST 2009, Oct. 2009, 4 pages.
Glatt,"Channel and Key Pressure (Aftertouch).", Retrieved from: <http://home.roadrunner.com/~jgglatt/tutr/touch.htm> on Jun. 11, 2012, 2012, 2 pages.
Hanlon,"ElekTex Smart Fabric Keyboard Goes Wireless", Retrieved from: <http://www.gizmag.com/go/5048/ > on May 7, 2012, Jan. 15, 2006, 5 pages.
Justin,"SEIDIO ACTIVE with Kickstand for the Galaxy SIII", Retrieved From: <http://www.t3chniq.com/seidio-active-with-kick-stand-gs3/> on Nov. 22, 2013, Jan. 3, 2013, 5 Pages.
Kaur,"Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012, Jun. 21, 2010, 4 pages.

(56) References Cited

OTHER PUBLICATIONS

Khuntontong,"Fabrication of Molded Interconnection Devices by Ultrasonic Hot Embossing on Thin Polymer Films", IEEE Transactions on Electronics Packaging Manufacturing, vol. 32, No. 3, Jul. 2009, pp. 152-156.
Kraus,"HumanToolz Mobile Stand: A new iPad kickstand on Kickstarter", Retrieved From: www.technologytell.com/apple/100699/humantoolz-mobile-stand-a-new-ipad-kickstand-on-kickstarter, Jul. 31, 2012, 9 Pages.
Lahr,"Development of a Novel Cam-based Infinitely Variable Transmission", Proceedings: In Thesis of Master of Science in Mechanical Engineering, Virginia Polytechnic Institute and State University, Nov. 6, 2009, 91 pages.
Lambert,"Cam Design", In Proceedings: Kinematics and dynamics of Machine, University of Waterloo Department of Mechanical Engineering, Jul. 2, 2002, pp. 51-60.
Lee,"LED Light Coupler Design for a Ultra Thin Light Guide", Journal of the Optical Society of Korea, vol. 11, Issue.3, Retrieved from <http://opticslab.kongju.ac.kr/pdf/06.pdf>, Sep. 2007, 5 pages.
Linderholm,"Logitech Shows Cloth Keyboard for PDAs", Retrieved from: <http://www.pcworld.com/article/89084/logitech_shows_cloth_keyboard_for_pdas.html> on May 7, 2012, Mar. 15, 2002, 5 pages.
McLellan,"Eleksen Wireless Fabric Keyboard: a first look", Retrieved from: <http://www.zdnetasia.com/eleksen-wireless-fabric-keyboard-a-first-look-40278954.htm> on May 7, 2012, Jul. 17, 2006, 9 pages.
Post,"E-Broidery: Design and Fabrication of Textile-Based Computing", IBM Systems Journal, vol. 39, Issue 3 & 4, Jul. 2000, pp. 840-860.
Prospero,"Samsung Outs Series 5 Hybrid PC Tablet", Retrieved from: <http://blog.laptopmag.com/samsung-outs-series-5-hybrid-pc-tablet-running-windows-8> on Oct. 31, 2013, Jun. 4, 2012, 7 pages.
Purcher,"Apple Designs a Future Built-In Stand for the iPad & More", Retrieved From: <http://www.patentlyapple.com/patently-apple/2011/02/apple-designs-a-future-built-in-stand-for-the-ipad-more.html> Jun. 11, 2014, Feb. 13, 2011, 9 pages.
Purcher,"Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012, Retrieved from: <http://www.patentlyapple.com/patently-apple/2012/01/apple-is-paving-the-way-for-a-new-3d-gui-for-ios-devices.html> on Jun. 4, 2012, Jan. 12, 2012, 15 pages.
Qin,"pPen: Enabling Authenticated Pen and Touch Interaction on Tabletop Surfaces", In Proceedings of ITS 2010, Available at <http://www.dfki.de/its2010/papers/pdf/po172.pdf>, Nov. 2010, pp. 283-284.
Sanap,"Design and Analysis of Globoidal Cam Index Drive", Proceedings: In International.Journal of Scientific Research Engineering & Technology, Jun. 2013, 6 Pages.
Siddiqui,"Hinge Mechanism for Rotatable Component Attachment", U.S. Appl. No. 13/852,848, Mar. 28, 2013, 51 pages.
Smith,"Quirky Cloak iPad Case Review", Retrieved From: http://notebooks.com/2011/02/03/quirky-cloak-ipad-case-review/, Feb. 3, 2011, 5 Pages.
Sumimoto,"Touch & Write: Surface Computing With Touch and Pen Input", Retrieved from: <http://www.gottabemobile.com/2009/08/07/touch-write-surface-computing-with-touch-and-pen-input/> on Jun. 19, 2012, Aug. 7, 2009, 4 pages.
Takamatsu,"Flexible Fabric Keyboard with Conductive Polymer-Coated Fibers", In Proceedings of Sensors 2011, Oct. 28, 2011, 4 pages.
Thurrott,"Surface Pro 3: Continuous Kickstand", Retrieved From: <http://winsupersite.com/mobile-devices/surface-pro-3-continuous-kickstand> Jun. 11, 2014, May 21, 2014, 5 Pages.
Valliath,"Design of Hologram for Brightness Enhancement in Color LCDs", Retrieved from <http://www.loreti.it/Download/PDF/LCD/44_05.pdf> on Sep. 17, 2012, May 1998, 5 pages.
Williams,"A Fourth Generation of LCD Backlight Technology", Retrieved from <http://cds.linear.com/docs/Application%20Note/an65f.pdf>, Nov. 1995, 124 pages.
Zhang,"Model-Based Development of Dynamically Adaptive Software", In Proceedings of ICSE 2006, Available at <http://www.irisa.fr/lande/lande/icse-proceedings/icse/p371.pdf>, May 20, 2006, pp. 371-380.
"International Search Report and Written Opinion", Application No. PCT/US2015/031271, Sep. 2, 2015, 10 pages.
"Advisory Action", U.S. Appl. No. 14/281,905, Feb. 19, 2016, 3 pages.
"Final Office Action", U.S. Appl. No. 14/281,905, Dec. 8, 2015, 6 pages.
"International Search Report and Written Opinion", Application No. PCT/US2015/052757, Dec. 4, 2015, 12 pages.
"Restriction Requirement", U.S. Appl. No. 14/502,867, Feb. 16, 2016, 7 pages.
"Notice of Allowance", U.S. Appl. No. 14/502,867, May 16, 2016, 14 pages.
"Non-Final Office Action", U.S. Appl. No. 14/281,905, Mar. 24, 2016, 5 pages.
"Second Written Opinion", Application No. PCT/US2015/031271, May 2, 2016, 5 pages.
"Corrected Notice of Allowance", U.S. Appl. No. 14/502,867, May 26, 2016, 2 pages.
"Corrected Notice of Allowance", U.S. Appl. No. 14/502,867, Aug. 8, 2016, 2 pages.
"International Preliminary Report on Patentability", Application No. PCT/US2015/052757, Sep. 5, 2016, 7 pages.
"International Preliminary Report on Patentability", Application No. PCT/US2015/031271, Sep. 16, 2016, 7 pages.
"International Search Report and Written Opinion", Application No. PCT/US2016/032242, Aug. 26, 2016, 12 pages.
"Notice of Allowance", U.S. Appl. No. 14/281,905, Sep. 23, 2016, 5 pages.

* cited by examiner

MULTISTAGE HINGE

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on.

Because mobile computing devices are configured to be mobile, the devices are typically designed to be used in a handheld manner. Traditional ways of adapting mobile devices for other uses (e.g., on a table or other surface) tend to be awkward and detract from the mobile aesthetic associated with mobile devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A multistage hinge is described. In at least some embodiments, the described hinge mechanism enables a support component to be adjustably attached to an apparatus, such as a computing device. According to various embodiments, a hinge mechanism includes different activity stages where movement of the hinge is based on different activity mechanisms. For instance, the hinge mechanism includes a spring-activated mechanism that controls movement of the hinge over a particular range of angles. Further, the hinge mechanism includes a friction mechanism (e.g., a "friction engine") that controls movement of the hinge over a different range of angles.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

A multistage hinge is described. In at least some implementations, the described hinge mechanism enables a support component to be adjustably attached to an apparatus, such as a computing device. For example, the hinge mechanism can be employed to rotatably attach a kickstand to a mobile computing device. The kickstand can be rotated via the hinge mechanism to various positions to provide support for different orientations of the computing device. This example is not intended to be limiting, however, and the described implementations can be used for hingeable attachment of a wide variety of different components to a wide variety of different apparatus.

According to various implementations, a hinge mechanism includes different activity stages where movement of the hinge is based on different activity mechanisms. For instance, the hinge mechanism includes a spring-activated mechanism that controls movement of the hinge over a particular range of angles. The hinge mechanism also includes a friction mechanism (e.g., a "friction engine") that controls movement of the hinge over a different range of angles. Further, the described hinge mechanism can transition between the spring-activated mechanism and the friction mechanism dependent on an angle at which the hinge is positioned. Thus, hinge mechanisms described herein provide users with a variety of different angles for component attachment to support a variety of different usage scenarios. Various attributes and components of example hinge mechanisms are presented in detail below.

In the following discussion, an example environment is first described that may employ the techniques described herein. Embodiments discussed herein are not limited to the example environment, and the example environment is not limited to embodiments discussed herein. Next, example device orientations are discussed in accordance with one or more embodiments. Following this, example hinges for support component attachment are discussed in accordance with one or more embodiments. Next, a section entitled "Hinge Responsive Profile" discusses an example torque profile for hinge movement in accordance with one or more embodiments. Finally, an example system and device are discussed that may implement various techniques described herein.

Example Environment

Figure 1:
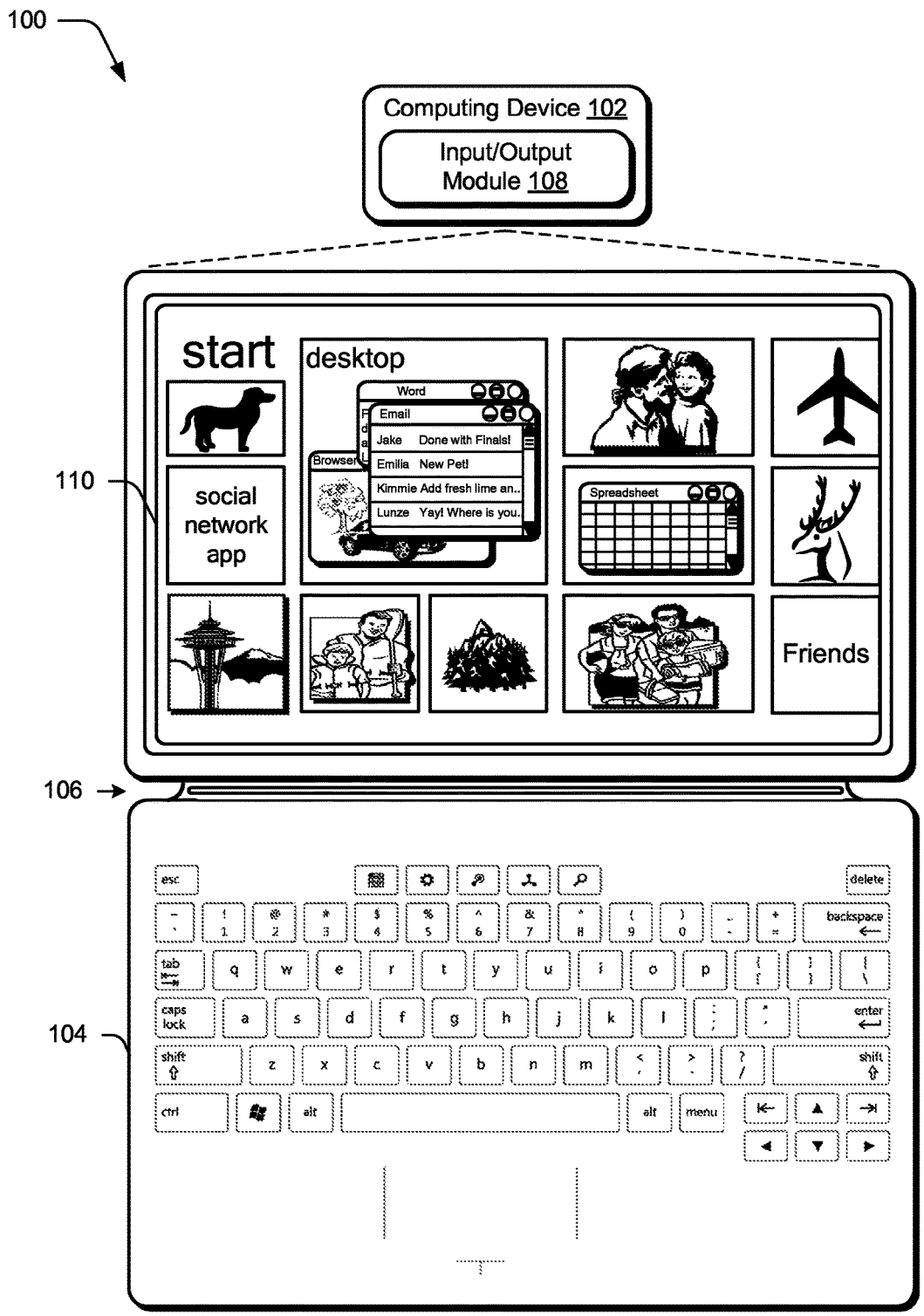
FIG. 1 is an illustration of an environment in an example implementation that is operable to employ the techniques described herein in accordance with one or more embodiments.

FIG. 1 is an illustration of an environment 100 in an example implementation that is operable to employ the techniques described herein. The illustrated environment 100 includes an example of a computing device 102 that is physically and communicatively coupled to an input device 104 via a flexible hinge 106. The computing device 102 may be configured in a variety of ways. For example, the computing device 102 may be configured for mobile use, such as a mobile phone, a tablet computer as illustrated, a wearable device, and so on.

While implementations presented herein are discussed in the context of a tablet device, it is to be appreciated that various other types and form factors of devices may be utilized in accordance with the claimed implementations. Thus, the computing device 102 may range from full resource devices with substantial memory and processor resources, to a low-resource device with limited memory and/or processing resources. An example implementation of the computing device 102 is discussed below with reference to FIG. 32.

The computing device 102 is illustrated as including an input/output module 108, which is representative of functionality relating to processing of inputs and rendering outputs of the computing device 102. A variety of different inputs may be processed by the input/output module 108, such as inputs relating to functions that correspond to keys of the input device 104, keys of a virtual keyboard displayed by the display device 110 to identify touch gestures and cause operations to be performed that correspond to the touch gestures that may be recognized through the input device 104 and/or touchscreen functionality of the display device 110, and so forth. Thus, the input/output module 108 may support a variety of different input techniques by recognizing and leveraging a division between types of inputs including key presses, touch gestures, touchless gestures recognized via a camera functionality of the computing device 102, and so on.

In the illustrated example, the input device 104 is configured as having an input portion that includes a keyboard having a QWERTY arrangement of keys and track pad although other arrangements of keys are also contemplated. Further, other non-conventional configurations are also contemplated, such as a game controller, configuration to mimic a musical instrument, and so forth. Thus, the input device 104 and keys incorporated by the input device 104 may assume a variety of different configurations to support a variety of different functionality.

As previously described, the input device 104 is physically and communicatively coupled to the computing device 102 in this example through use of a flexible hinge 106. The flexible hinge 106 is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one or more directions (e.g., vertically in the figure) yet restrict movement in other directions, such as lateral movement of the input device 104 in relation to the computing device 102. This may be used to support consistent alignment of the input device 104 in relation to the computing device 102, such as to align sensors used to change power states, application states, and so on.

Example Device Orientations

Figure 2:
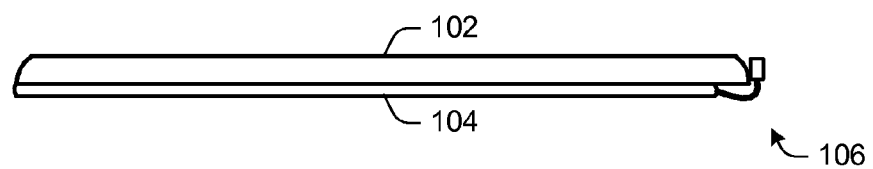
FIG. 2 illustrates an example orientation of an input device in relation to a computing device as covering a display device of the computing device in accordance with one or more embodiments.

According to various embodiments, a variety of different orientations of the computing device 102 are supported. For example, rotational movement may be supported by the flexible hinge 106 such that the input device 104 may be placed against the display device 110 of the computing device 102 and thereby act as a cover as shown in the example orientation 200 of FIG. 2. Thus, the input device 104 may act to protect the display device 110 of the computing device 102 from harm.

Figure 3:
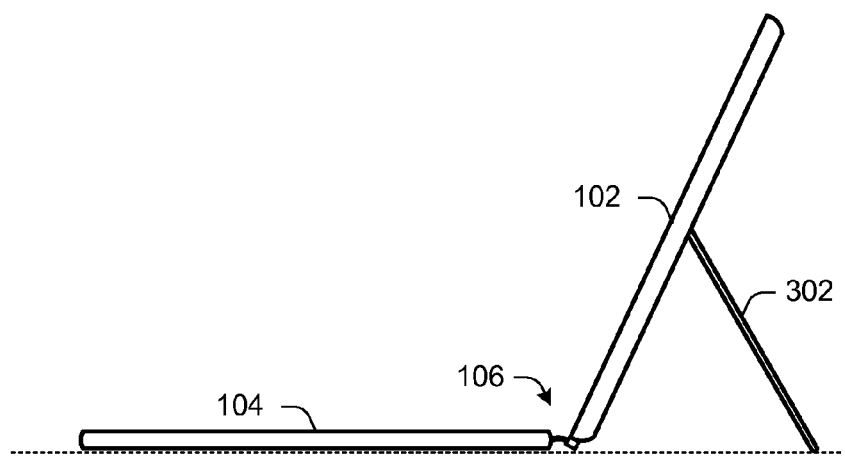
FIG. 3 illustrates an example orientation of an input device in relation to a computing device as assuming a typing orientation in accordance with one or more embodiments.

As shown in the example orientation 300 of FIG. 3, a typing arrangement may be supported. In this orientation, the input device 104 is laid flat against a surface and the computing device 102 is disposed at an angle to permit viewing of the display device 110, e.g., such as through use of a kickstand 302 disposed on a rear surface of the computing device 102. According to various implementations, the kickstand 302 can be employed as a support component to enable a variety of different orientations for the computing device 102, some of which are described herein. Naturally, a variety of other orientations other than those expressly illustrated and discussed herein are also supported.

Figure 4:
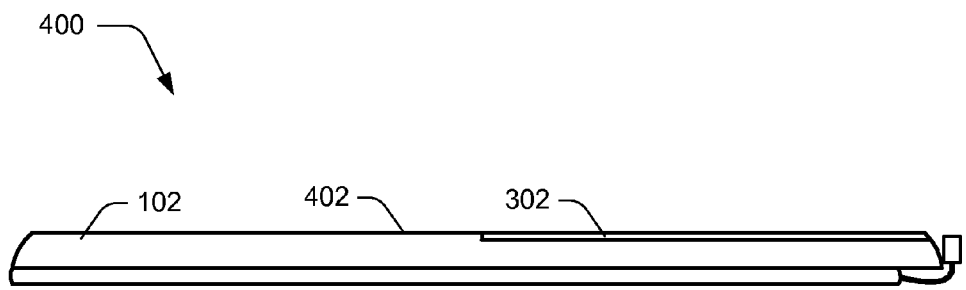
FIG. 4 illustrates an example orientation of a computing device with a support component in accordance with one or more embodiments.

FIG. 4 illustrates a position 400 which represents the kickstand 302 in a closed position. In the closed position, the kickstand 302 forms a portion of a rear surface 402 of the computing device 102 such that the kickstand 302 conforms to a surface contour of the computing device 102. For instance, when the kickstand 302 is in the closed position, the kickstand 302 integrates into the computing device 102 and does not protrude from a plane formed by the rear surface 402.

Figure 5:
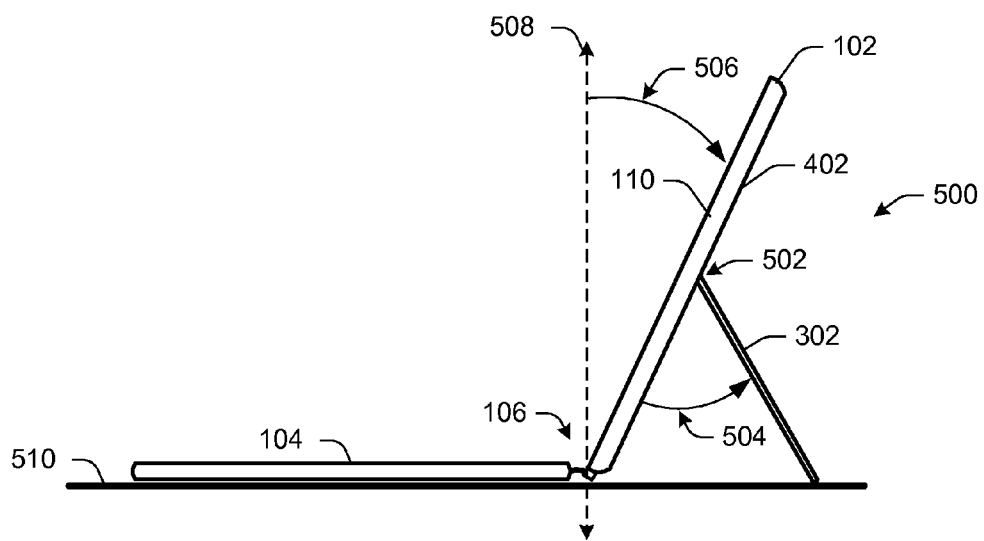
FIG. 5 illustrates an example orientation of a computing device with a support component in accordance with one or more embodiments.

FIG. 5 illustrates that the kickstand 302 can be rotated away from the rear surface 402 of the computing device 102 to a position 500. For instance, the kickstand 302 can be rotatably attached to the computing device 102 along a seam 502 via a hinge mechanism. Examples of such a hinge mechanism are detailed below.

In at least some implementations, the position 500 corresponds to a preset position for the kickstand 302. For instance, when a user applies pressure to the kickstand 302 away from the rear surface 402, the kickstand 302 can snap into the position 500. In this example, the position 500 is associated with an angle 504 between the rear surface 402 of the computing device 102 and the kickstand 302. For instance, the angle 504 can range from 40 degrees (40°) to 120 degrees (120°). The angle 504, for example, is approximately 42°, +/−2°. Any suitable angle and/or range of angles may be employed, however.

According to various implementations, the position 500 places the front surface of the display device 110 at an angle 506 relative to a vertical line 508. The vertical line 508, for instance, is normal (i.e., 90°) to a surface 510 on which the computing device 102 and the kickstand 302 are disposed. In this particular example, the angle 506 is approximately 21°, +/−2°. The angle 506, for instance, is one-half of the angle 504.

The position 500 enables a variety of different usage scenarios, such as by allowing the display device 110 to be viewed and input to be provided to the computing device 102 via the input device 104. Alternatively or additionally, the position 500 enables a user to interact with a touchscreen of the computing device 102.

According to various implementations, manipulating the kickstand 302 further open past the position 500 engages a friction mechanism within hinges that attach the kickstand 302 to the computing device 102. For instance, opening the kickstand 302 further from the position 500 changes a torque profile that characterizes a torque response that resists movement of the kickstand 302.

Figure 6:
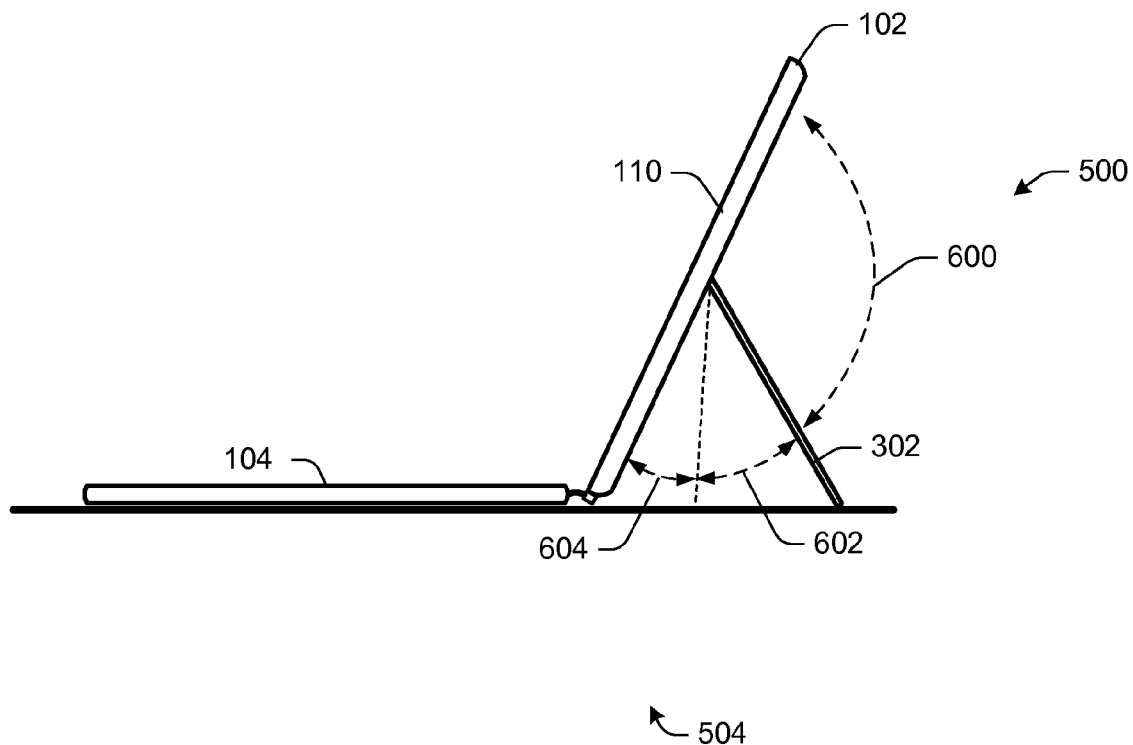
FIG. 6 illustrates an example orientation of a computing device with a support component in accordance with one or more embodiments.

FIG. 6 illustrates the computing device 102 with the kickstand 302 in the position 500 introduced above. Further illustrated is a friction angle range 600 that specifies a range of angles over which movement of the kickstand 302 behaves according to a friction torque response. For instance, if a user manipulates the kickstand 302 to any angle within the friction angle range 600 and releases the kickstand 302, the kickstand 302 will remain in the position in which it is released absent further force applied to move the kickstand 302. The friction hinge that attaches the kickstand 302 to the computing device 102, for example, prevents the kickstand 302 from moving from a position at which the kickstand 302 is released unless sufficient force is applied to the kickstand 302. Gravitational force and/or the weight of the computing device 102, for example, will not displace the kickstand 302 from the position at which it is released.

FIG. 6 further depicts an opening angle range 602 and a closing angle range 604. According to various implementations, when the kickstand 302 is manipulated to an angle within the opening angle range 602 and released, the kickstand 302 will automatically snap into the position 500. For instance, spring force supplied by a hinge will push the kickstand 302 from an angle within the opening angle range 602 into the position 500. However, if the kickstand 302 is manipulated to an angle within the closing angle range 604 and released, the kickstand 302 will snap to a closed position. For instance, spring force supplied by a hinge will push the kickstand 302 from an angle within the closing angle range 604 into a closed position. An example closed position is depicted and discussed with reference to FIG. 4.

Figure 7:
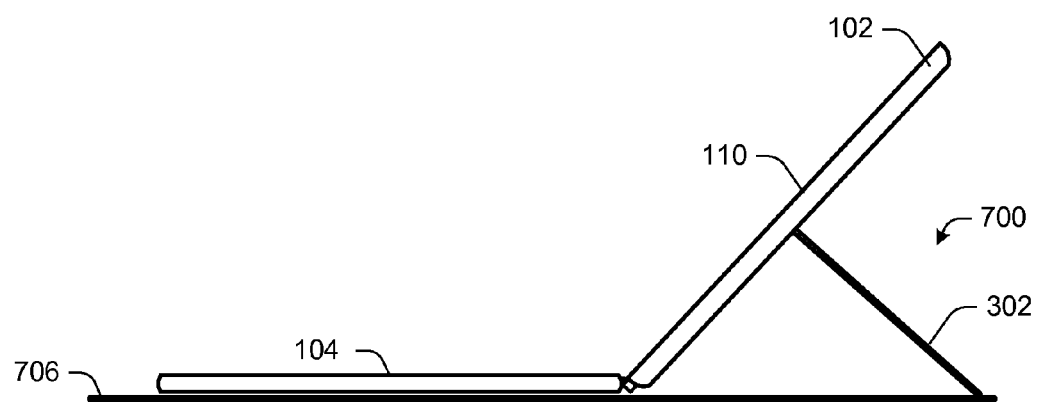
FIG. 7 illustrates an example orientation of a computing device with a support component in accordance with one or more embodiments.

FIG. 7 illustrates that the kickstand 302 can be rotated further past the position 500 to a position 700. Generally, the kickstand 302 is held in the position 700 via a friction mechanism, examples of which are detailed below. In the position 700, the computing device is reclined in comparison to previously-discussed orientations, such as the position 500. As illustrated, the position 700 presents the display device 110 at a more open angle that supports different usage scenarios. For instance, the position 700 supports use of the computing device 102 in a user's lap, such as during air travel. A variety of other usage scenarios are supported by the position 700, such as for tall users that may have a higher viewing angle, use on a low surface (e.g., a coffee table), and so forth.

Figure 8:
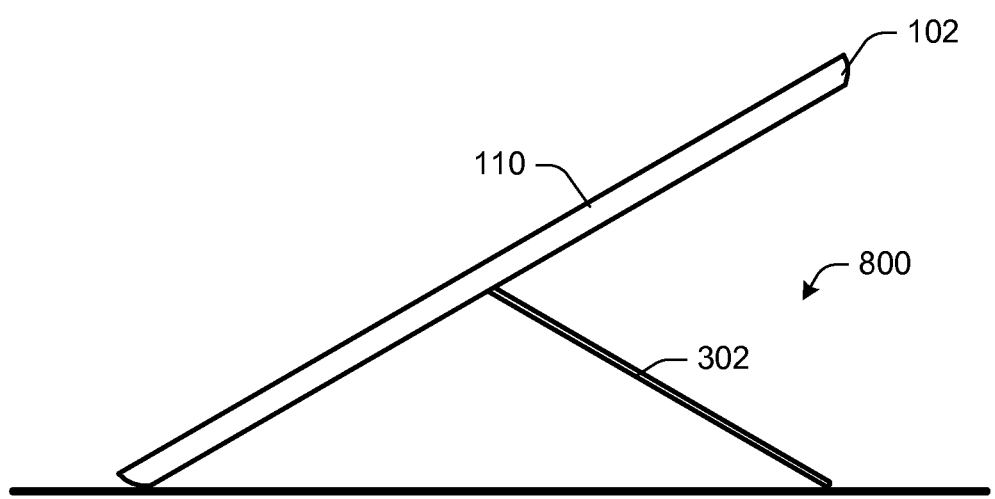
FIG. 8 illustrates an example orientation of a computing device with a support component in accordance with one or more embodiments.

FIG. 8 illustrates that the kickstand 302 can be rotated further from the position 700 to a position 800. Generally, the kickstand 302 is held in the position 800 via a friction mechanism, examples of which are detailed below. FIG. 8 also depicts that the input device 104 is detached from the computing device 102. As discussed above, the input device 104 is removably attached to the computing device 104 to support a variety of different usage scenarios.

Figure 9:
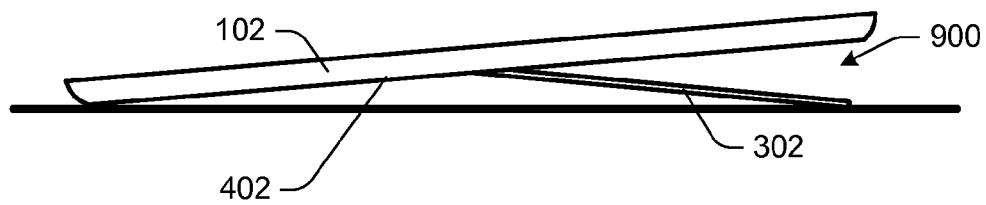
FIG. 9 illustrates an example orientation of a computing device with a support component in accordance with one or more embodiments.

FIG. 9 illustrates that the kickstand 302 can be rotated further away from the rear surface 402 of the computing device 102 to a position 900. For instance, the kickstand 302 can be rotated further past the position 800 to the position 900. Generally, the kickstand 302 is held in the position 900 via a friction mechanism, examples of which are detailed below.

In at least some implementations, the position 900 represents maximum open position for the kickstand 302. A hinge mechanism that attaches the kickstand 302 to the computing device 102, for example, will not open further past the position 900.

Figure 10:
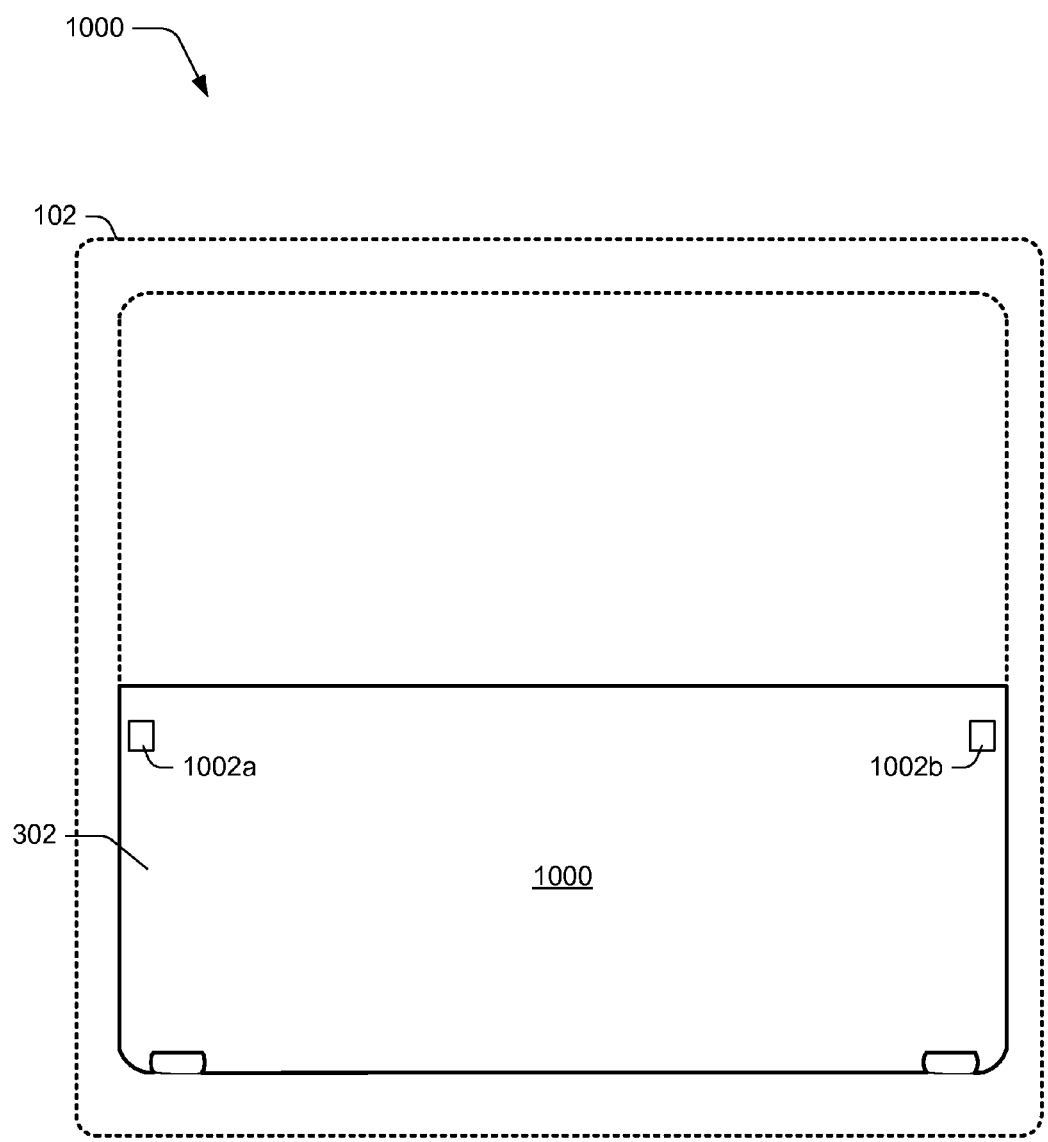
FIG. 10 illustrates an example inner surface of a support component in accordance with one or more embodiments.

FIG. 10 illustrates a view of an inner surface 1000 of the kickstand 302 in accordance with one or more embodiments. In this example, the kickstand 302 is illustrated in the context of an outline of a chassis of the computing device 102. The inner surface 1000 includes hinge mounts 1002a, 1002b, which function as mounting points for hinge mechanisms that are employed to attach the kickstand 302 to the computing device 102. Examples of such hinge mechanisms are discussed below.

Hinges for Component Attachment

A variety of different hinge mechanisms can be employed for attaching various components in accordance with various embodiments. Some example hinge mechanisms and hinge arrangements are discussed below.

Figure 11:
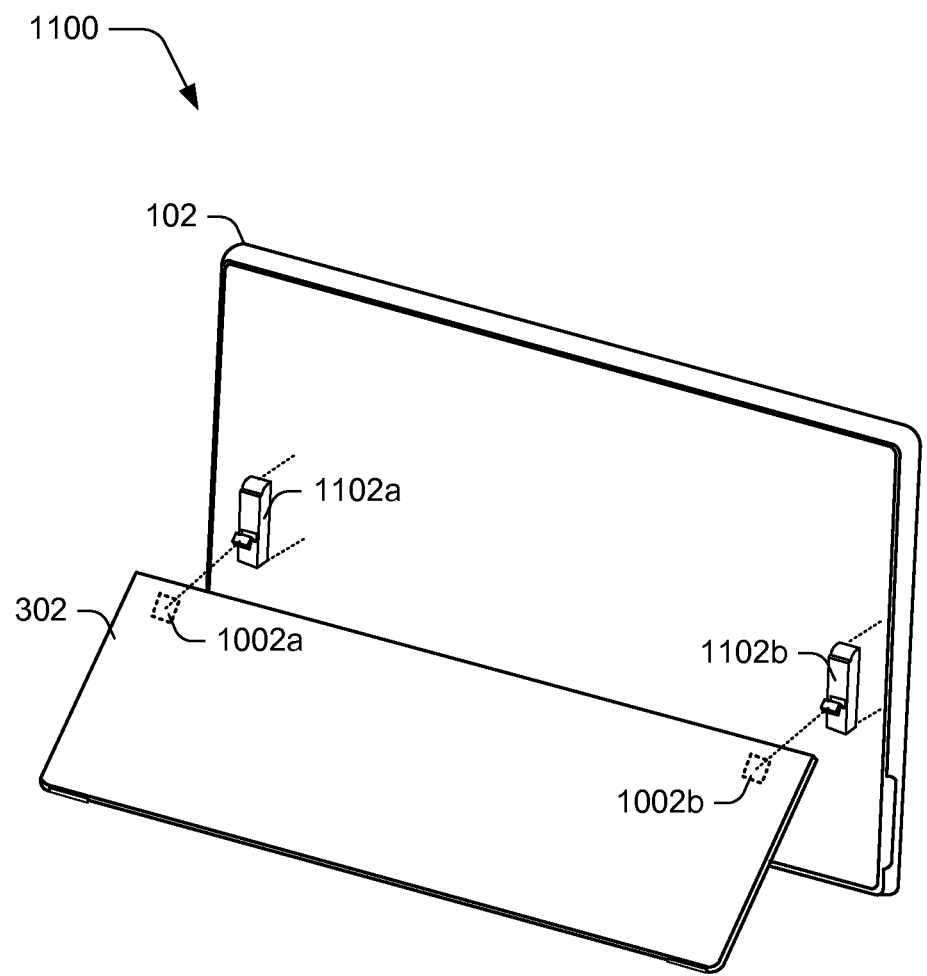
FIG. 11 illustrates an example exploded view of a computing device with a support component in accordance with one or more embodiments.

FIG. 11 illustrates an exploded rear view 1100 of a chassis of the computing device 102 and the kickstand 302. Included in the rear view 1100 are hinges 1102a and 1102b, which are employed to attach the kickstand 302 to the computing device 102. The hinges 1102a, 1102b are configured to be installed internally in the computing device 102, such as via a suitable attachment method and/or device.

The kickstand 302 can be attached to a pivoting portion of the hinges 1102a, 1102b via the hinge mounts 1002a, 1002b. Thus, attachment to the hinges 1102a, 1102b enables the kickstand 302 to pivot between various positions relative to the computing device 102.

Figure 12:
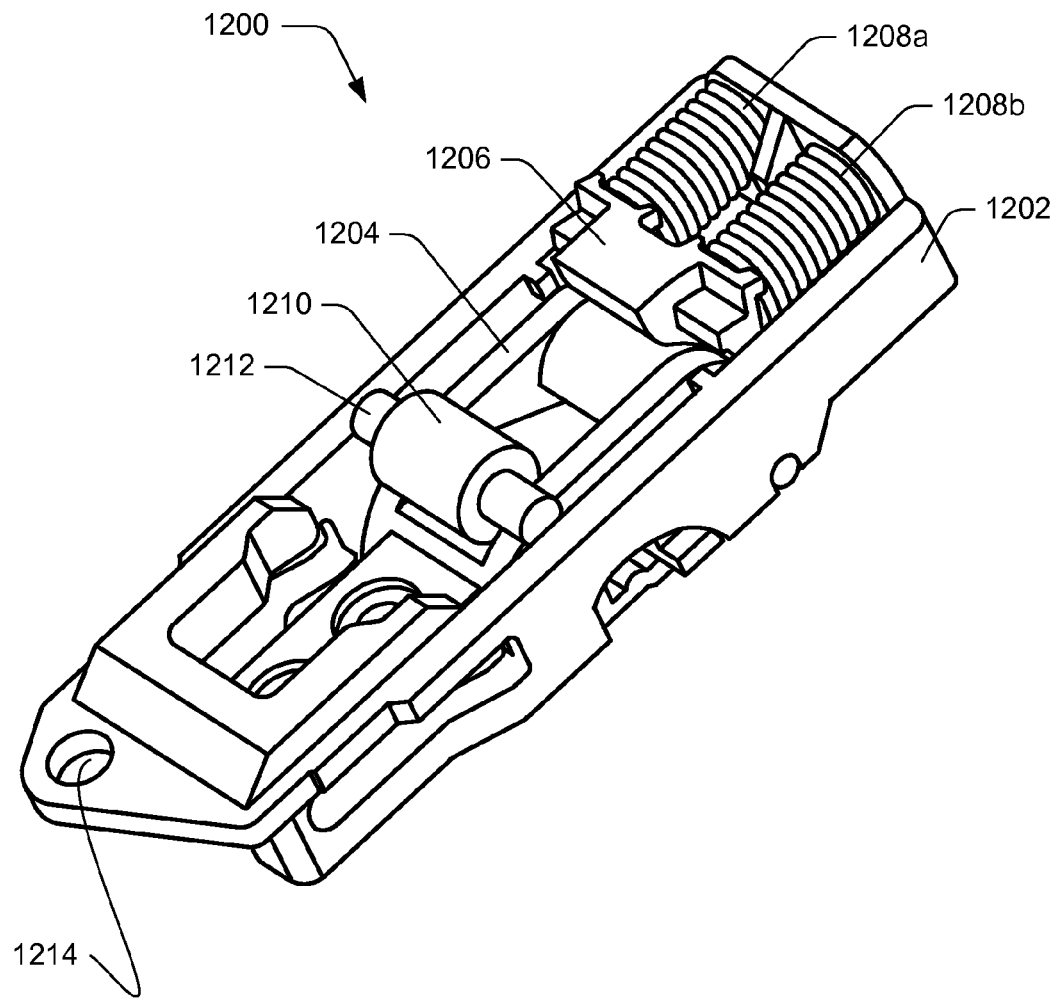
FIG. 12 depicts an isometric view of an example hinge in accordance with one or more embodiments.

FIG. 12 depicts an isometric view of an example hinge 1200 in accordance with one or more embodiments. The hinge 1200, for instance, represents an implementation of the hinges 1102a, 1102b discussed above. This is not intended to be limiting, however, and the hinge 1200 can be employed as a hinge mechanism for a variety of different components and in a variety of different attachment scenarios. The hinge 1200 and its various components can be formed using any suitable material and/or combination of materials, such as metals, plastics, polymers, alloys, and so forth. Generally, the view depicted in FIG. 12 represents the hinge 1200 in a closed position, such as the position 400 depicted in FIG. 4.

Components of the hinge 1200 include a hinge frame 1202 in which various other components of the hinge 1200 can be disposed. For example, the hinge frame 1202 can be mounted to and/or within a device (e.g., the computing device 102) and function as a support structure for other components of the hinge 1200.

Positioned within and/or attached to the hinge frame 1202 are various components of the hinge 1200, including a cam 1204, a cam follower 1206, hinge springs 1208a, 1208b, a hinge band 1210, and a guide pin 1212. Generally, these components of the hinge 1200 interact during movement of the hinge 1200 to provide a particular responsiveness profile over different hinge positions. These and other components of the hinge 1200 are detailed in subsequent figures and discussion.

The hinge 1200 further includes a mounting hole 1214 through which a fastening device can be placed to attach the hinge 1200 to an apparatus, such as the computing device 102.

Figure 13:
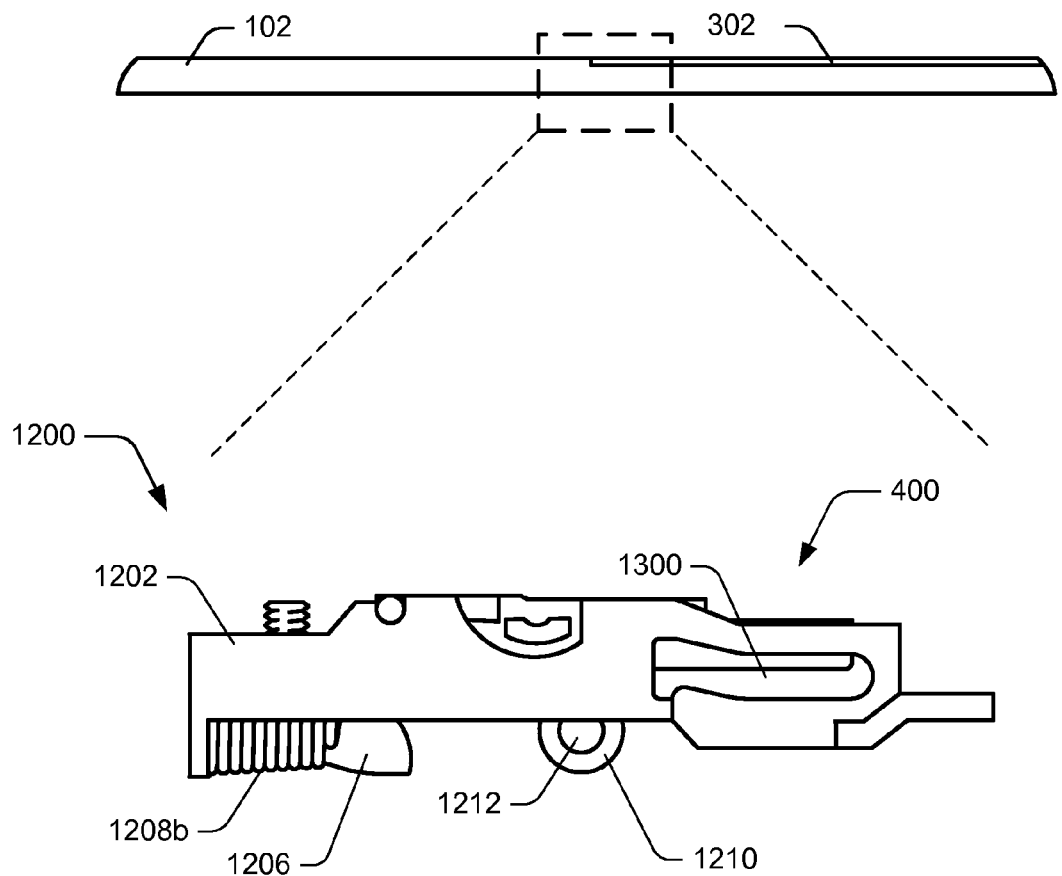
FIG. 13 depicts a side view of an example hinge in accordance with one or more embodiments.

FIG. 13 depicts a side view of the hinge 1200 in accordance with one or more implementations. Generally, the view depicted in FIG. 13 represents the hinge 1200 in a closed position, such as the position 400 depicted in FIG. 4. This side view illustrates the hinge frame 1202, the cam follower 1206, the hinge spring 1208b, the hinge band 1210, and the guide pin 1212 positioned at least partially within the hinge band 1210. Further illustrated is a guide slot 1300 formed within the hinge frame 1202. A further detailed below, when the hinge 1200 is opened to particular positions, the guide pin 1212 engages within the guide slot 1300 to control movement of various components of the hinge 1200 in various open positions.

Figure 14:
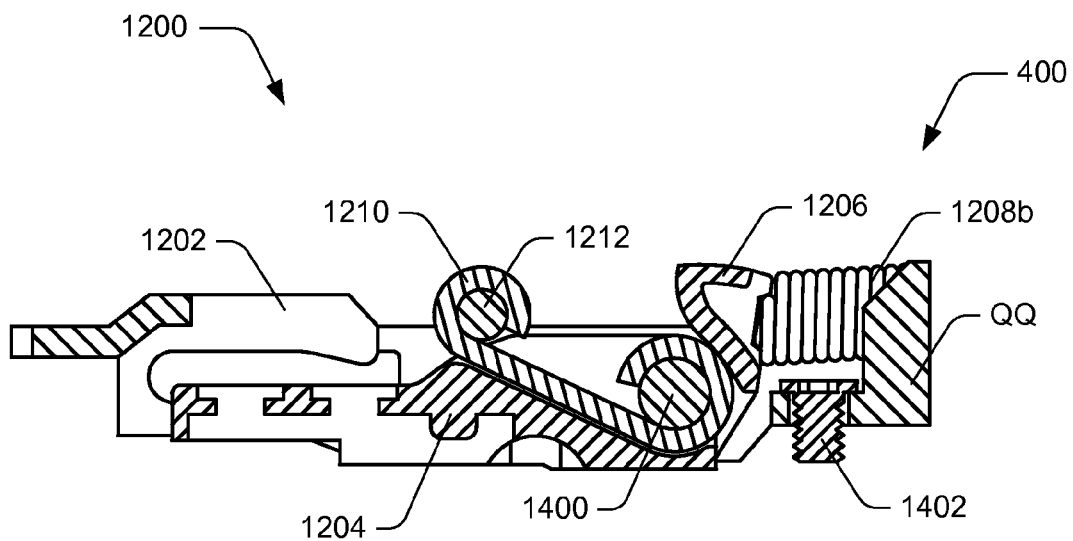
FIG. 14 depicts a side cutaway view of an example hinge in accordance with one or more embodiments.

FIG. 14 depicts a side cutaway view of the hinge 1200 in accordance with one or more implementations. Generally, the view depicted in FIG. 14 represents the hinge 1200 in a closed position, such as the position 400 depicted in FIG. 4. The side cutaway view illustrates the hinge frame 1202, the cam 1204, the cam follower 1206, the hinge spring 1208b, the hinge band 1210, and the guide pin 1212.

As illustrated, the guide pin 1212 is positioned partially within the hinge band 1210. For instance, the hinge band at least partially wraps around the guide pin 1212. In at least some implementations, the guide pin 1212 is fastened to the hinge band 1210, such as via pressing, welding, adhesive, and so forth. Alternatively, the guide pin 1212 may be positioned within the hinge band 1210 such that the guide pin 1212 may rotate relative to the hinge band 1210. As yet another alternative implementation, the guide pin 1212 may be implemented as an integrated feature of the hinge band 1210 such that the hinge band 1210 and the guide pin 1212 are formed from a single piece of material.

Further depicted in FIG. 14 is a friction pin 1400 positioned within the hinge band 1210. For instance, the hinge band 1210 at least partially wraps around the friction pin 1400 at an opposite end of the hinge band 1210 from the guide pin 1212. As further depicted in subsequent figures, the friction pin 1400 fastens the hinge band 1210 to the cam 1204, and contributes to a torque profile of the hinge 1200 in various open positions.

According to various implementations, spring force from the hinge springs 1208a, 1208b applies pressure to the cam follower 1206 and causes the cam follower 1206 to apply pressure to (e.g., engage with) the hinge band 1210. This pressure on the cam 1204 keeps the cam 1204 in a closed position and provides a certain amount of resistance to opening of the hinge 1200. For instance, this pressure prevents the kickstand 302 from sagging relative to the computing device 102, and provides resistance to opening of the kickstand 302 from a closed position.

As discussed herein, "opening" of the kickstand 302 and/or the hinge 1200 refers to a movement of the kickstand 302 and/or the hinge 1200 away from a closed position (e.g., the position 400) toward an open position. Further, "closing" of the kickstand 302 and/or the hinge 1200 refers to a movement of the kickstand 302 and/or the hinge 1200 from an open position toward a closed position, e.g., toward the position 400.

Further illustrated in FIG. 14 is a hinge fastener 1402, which fastens the hinge 1200 to a chassis of an associated apparatus. For instance, the hinge fastener 1402 fastens the hinge 1200 internally within a chassis of the computing device 102 or other apparatus.

Figure 15:
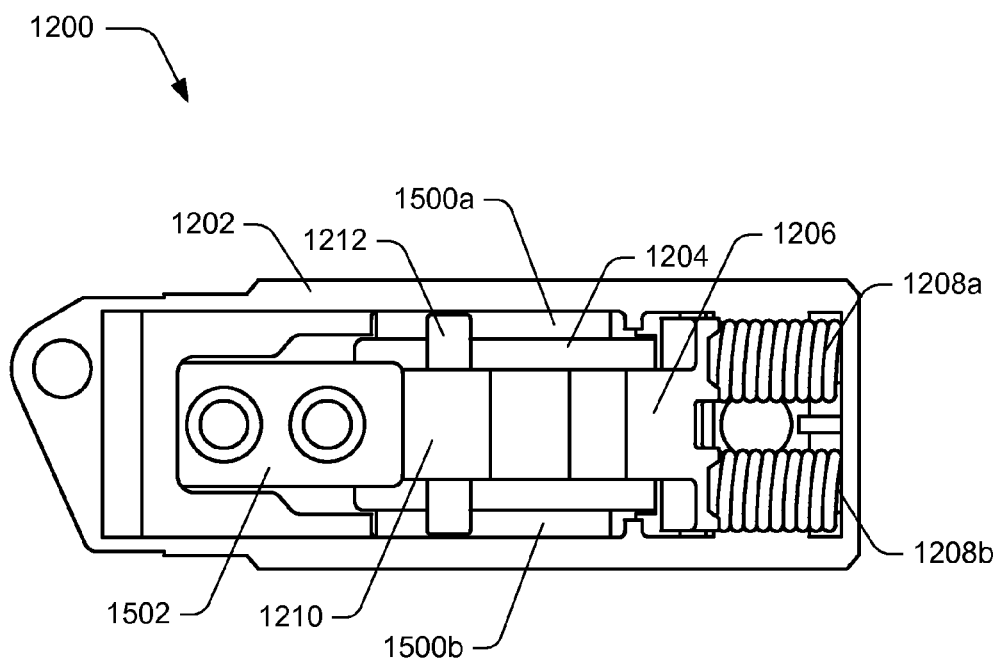
FIG. 15 depicts an overhead view of an example hinge in accordance with one or more embodiments.

FIG. 15 depicts an overhead view of the hinge 1200 in accordance with one or more implementations. Generally, the view depicted in FIG. 15 represents the hinge 1200 in a closed position, such as the position 400 depicted in FIG. 4. The overhead view illustrates the hinge frame 1202, the cam 1204, the cam follower 1206, the hinge springs 1208a, 1208b, the hinge band 1210, and the guide pin 1212.

Further depicted are a support plate 1500a, a support plate 1500b, and a component mount 1502. As further detailed below, the support plates 1500a, 1500b provide support for the cam 1204 when the hinge 1200 is in various open positions.

The component mount 1502 represents a portion of the cam 1204 that is attachable to a component. For instance, the component mount 1502 is leveraged to attach the cam 1204, and thus the hinge 1200, to the kickstand 302. In this particular implementation, the component mount 1502 includes mounting holes through which a mounting mechanism such as a screw, a bolt, a rivet, and so forth, can be placed to attach the cam 1204 to a component.

Figure 16:
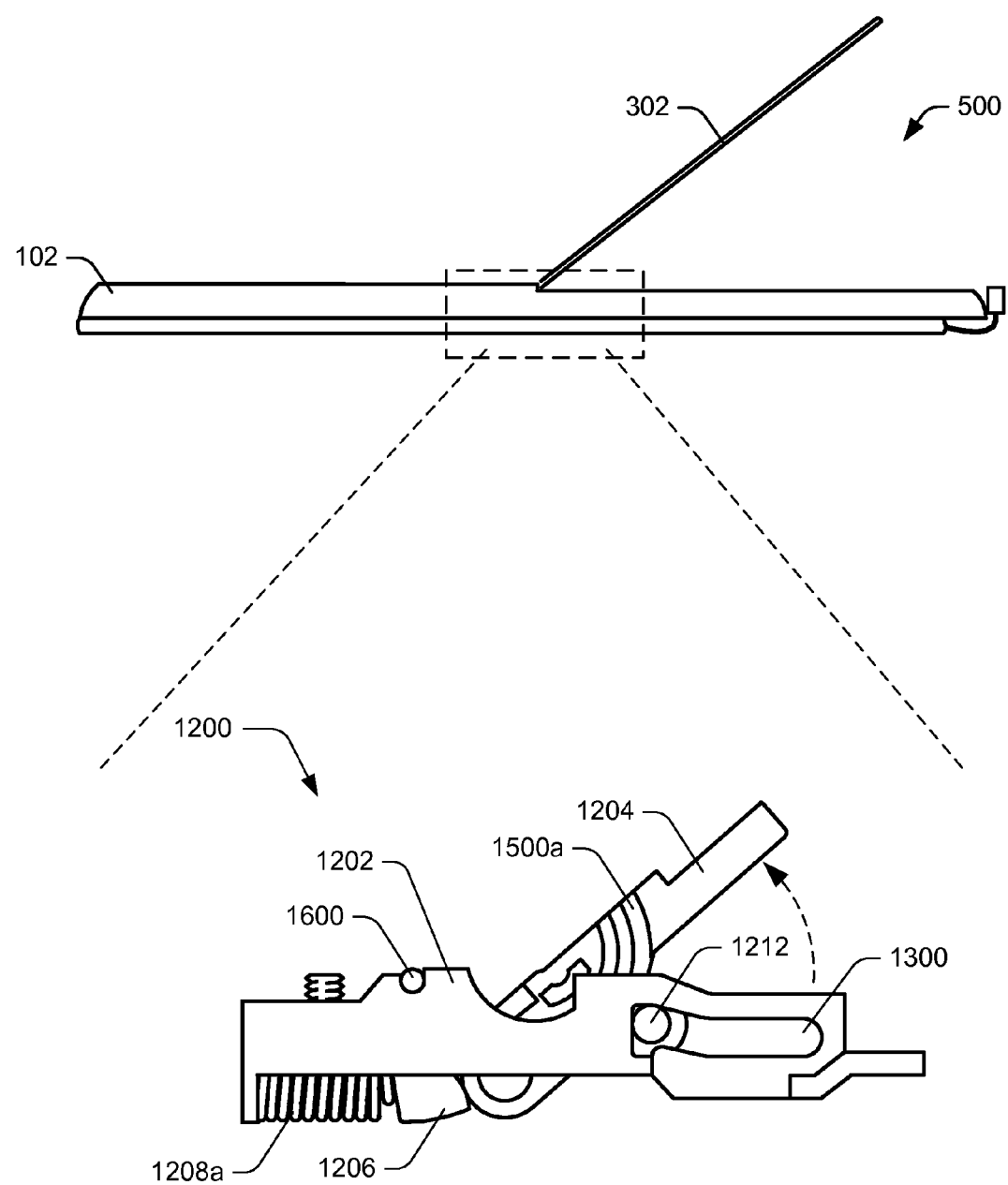
FIG. 16 depicts a side view of an example hinge in accordance with one or more embodiments.

FIG. 16 depicts a side view of the hinge 1200 opened to the position 500 in accordance with one or more implementations. For instance, a user manipulates the kickstand 302 from a closed position relative to the computing device 102 to the preset open position 500 introduced with reference to FIG. 5.

Consider, for example, that a user opens the kickstand 302 until the kickstand 302 is at an angle within the opening angle range 602 discussed above with reference to FIG. 6. The user then releases the kickstand 302, which causes the hinge 1200 to snap into the position 500.

According to various implementations, when the kickstand 302 is released within the opening angle range 602, spring force from the hinge springs 1208a, 1208b pushes the cam follower 1206 against the cam 1204, which causes the cam 1204 to snap into the position 500. For instance, the cam follower 1206 pivots about a follower axle 1600 that is engaged within the hinge frame 1202. Generally, the follower axle 1600 represents a feature of the cam follower 1206 that enables pivotable attachment of the cam follower 1206 to the hinge frame 1202.

However, if the kickstand 302 is opened to angle within the closing angle range 604 depicted in FIG. 6 and then released, spring force from the hinge springs 1208a, 1208b pushes the cam follower 1206 against the cam 1204 and causes the cam 1204 to snap into a closed position, e.g., the position 400. Generally, the surface profile of the cam follower 1206 creates a dynamic interface between the cam follower 1206 and the cam 1204 which causes the hinge 1200 to snap into either a closed position or a preset open position, depending on an angle to which the kickstand 302 is manipulated.

FIG. 16 further illustrates that in the position 500, the guide pin 1212 engages with the guide slot 1300 in the hinge frame 1202. As detailed below, during further opening of the hinge 1200 from the position 500, the guide slot 1300 constrains movement of the guide pin 1212.

In response to movement of the cam 1204 to the position 500, the support plate 1500a moves along with the cam 1204 and partially protrudes from the hinge frame 1202. The cam 1204, for instance, includes a catch feature that engages with the support plate 1500a such that when the cam 1204 is moved to an open position, the support plate 1500a moves along with the cam 1204. Although various features and behaviors are discussed herein with reference to a particular instance of the support plates 1500a, 1500b, it is to be appreciated that similar features may apply to both instances of the support plates 1500a, 1500b.

Figure 17:
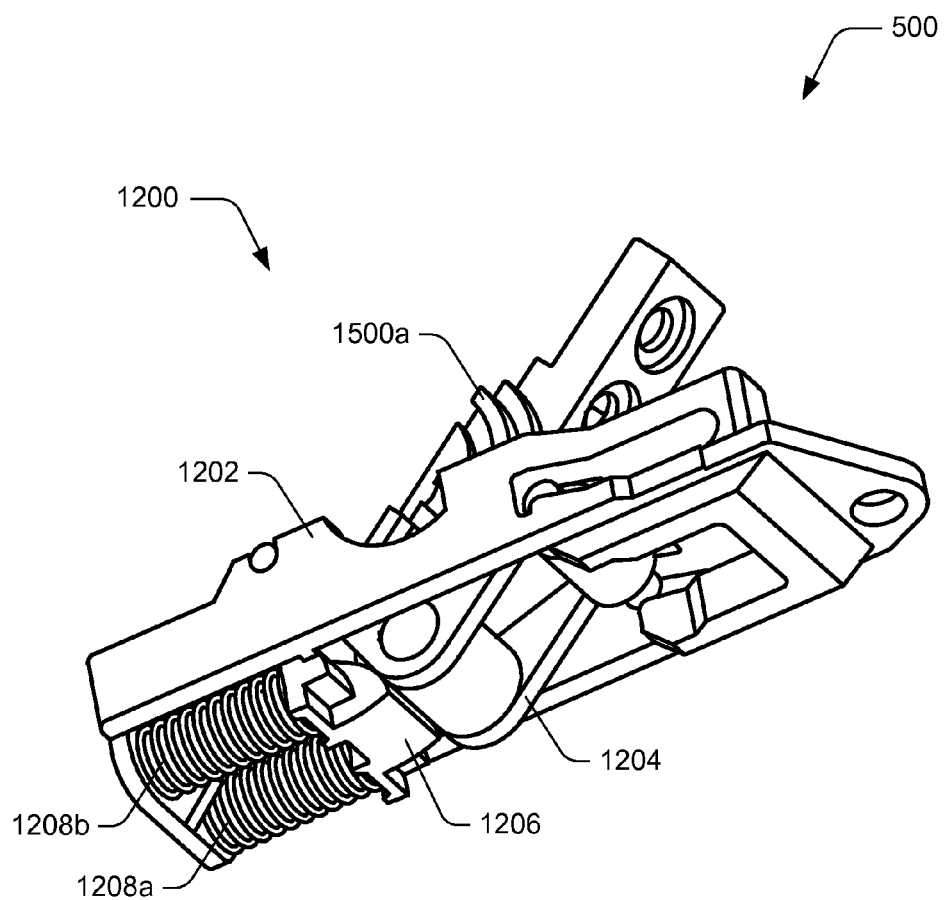
FIG. 17 depicts an isometric view of an example hinge in accordance with one or more embodiments.

FIG. 17 depicts an isometric view of the hinge 1200 opened to the position 500 in accordance with one or more implementations. Shown here is the interface between the cam follower 1206 and the cam 1204 that causes the response profile of the hinge 1200 between a closed position and the position 500. As discussed above, spring force from the hinge springs 1208a, 1208b pushes the cam follower 1206 against the cam 1204, which causes the cam 1204 to snap into the position 500. FIG. 17 further depicts the support plate 1500a partially protruding from the hinge frame 1202.

Figure 18:
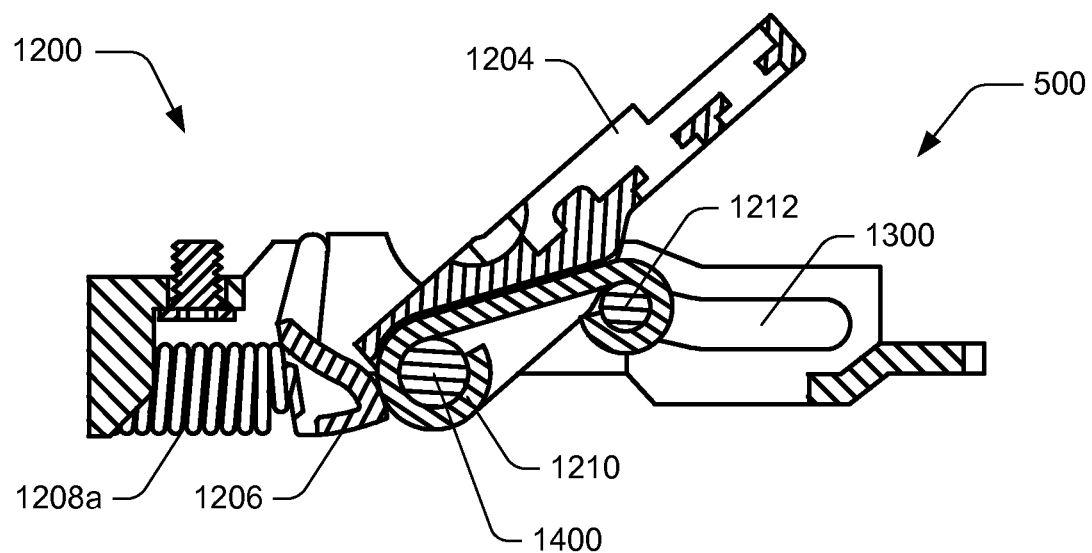
FIG. 18 depicts a side cross section view of an example hinge in accordance with one or more embodiments.

FIG. 18 depicts a side cross section view of the hinge 1200 in the position 500 in accordance with one or more implementations. FIG. 18 illustrates the hinge spring 1208a, the cam follower 1206, the cam 1204, the hinge band 1210 with the guide pin 1212 and the friction pin 1400, and the guide slot 1300. As discussed above, in the position 500 the guide pin 1212 engages with the guide slot 1300.

Opening of the hinge 1200 past the position 500 causes the guide pin 1212 to move laterally within the guide slot 1300 and the friction pin 1400 to rotate relative to the hinge band 1210. The friction pin 1400, for instance, is rotatably engaged with the hinge band 1210 such that opening the hinge 1200 past the position 500 causes a relative rotation between the friction pin 1400 and the hinge band 1210. This interface between the friction pin 1400 and the hinge band 1210 generates frictional force that resists movement of the hinge 1200 and enables the hinge 1200 to be placed in a variety of different open positions.

According to various implementations, further opening of the hinge 1200 from the position 500 represents a transition from a spring-activated torque profile to a friction torque profile. For instance, movement of the hinge 1200 between a closed position and the position 500 is determined by spring force applied by the hinge springs 1208a, 1208b against the cam follower 1206, and the resulting interface between the cam follower 1206 and the cam 1204. However, movement of the hinge 1200 to a further open position from the position 500 is determined by frictional force generated by a friction engine that generally includes the hinge band 1210 and the friction pin 1400. Thus, the hinge 1200 may be characterized as a multistage hinge that transitions between different torque profiles dependent on an angle at which the hinge 1200 is positioned.

Figure 19:
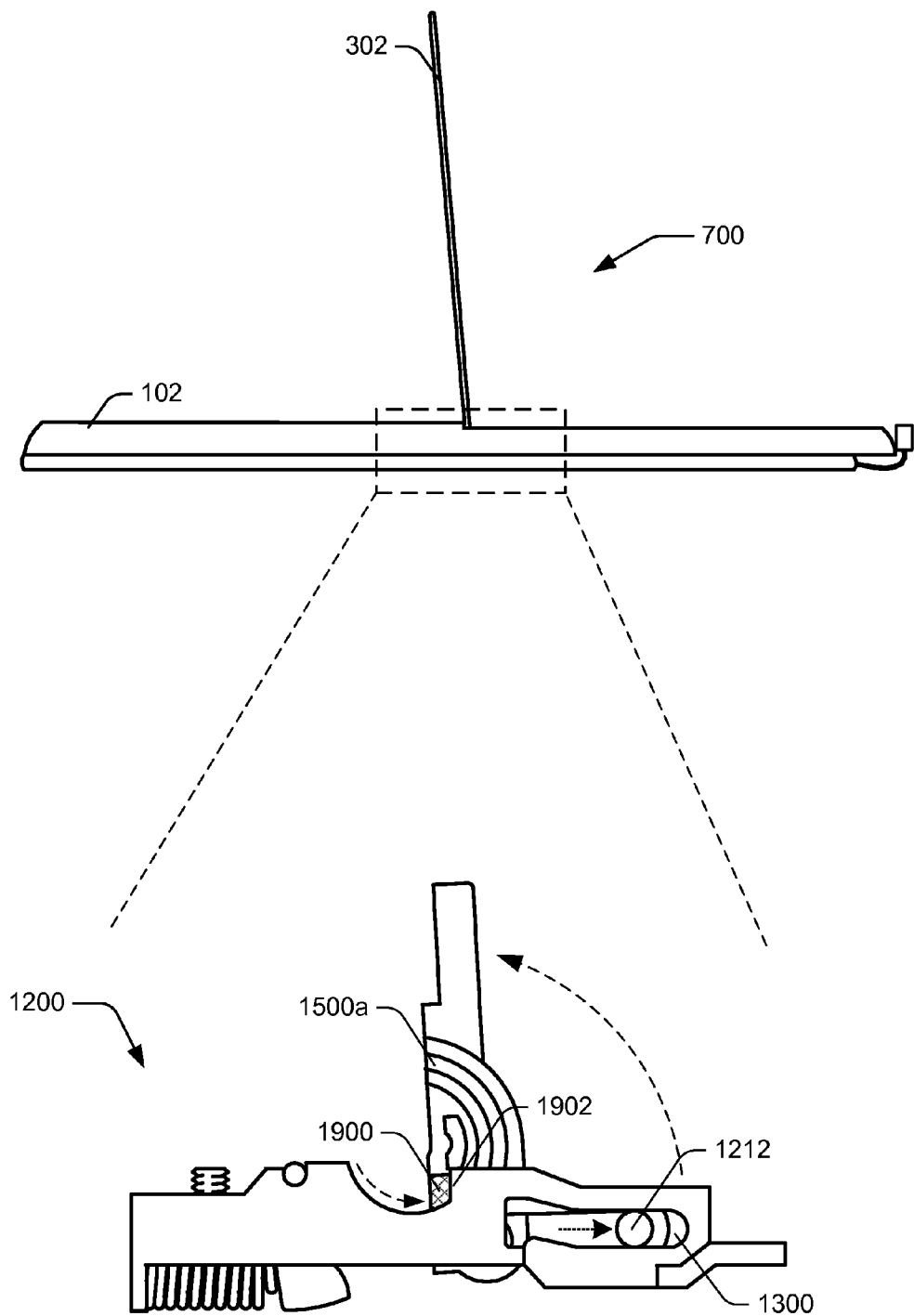
FIG. 19 depicts a side view of an example hinge in accordance with one or more embodiments.

FIG. 19 depicts a side view of the hinge 1200 opened to the position 700 in accordance with one or more implementations. For instance, a user manipulates the kickstand 302 from the preset open position 500 to the position 700 introduced with reference to FIG. 7.

As illustrated, movement to the position 700 causes the guide pin 1212 to move within the guide slot 1300. For instance, the guide slot 1300 constrains movement of the guide pin 1212 according to an inner surface profile of the guide slot 1300. Further, the support plate 1500a moves along with the cam 1204 to the position 700, at which point a plate stopper 1900 on the support plate 1500a engages with a plate catch 1902 on the hinge frame 1202. Generally, engagement of the plate stopper 1900 with the plate catch 1902 prevents the support plate 1500a from further movement out of the hinge frame 1202.

Figure 20:
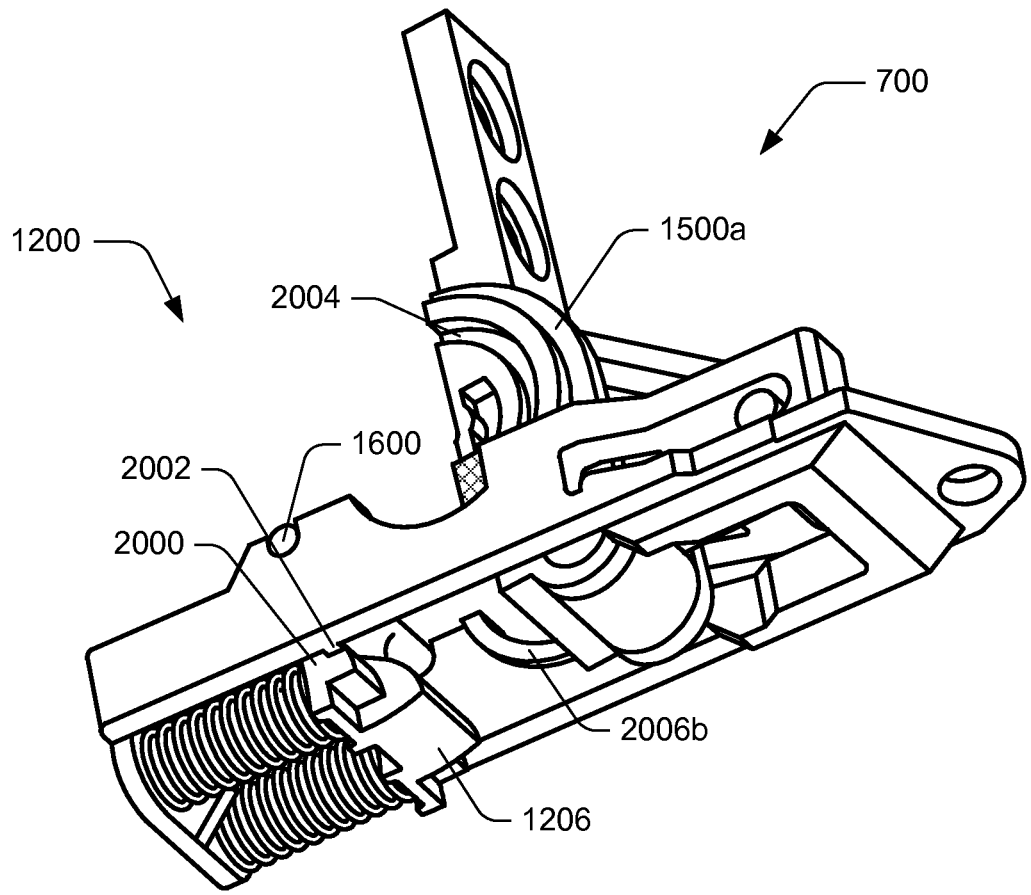
FIG. 20 depicts an isometric view of an example hinge in accordance with one or more embodiments.

FIG. 20 depicts an isometric view of the hinge 1200 in the position 700 in accordance with one or more implementations. This view shows a follower stopper 2000 on the cam follower 1206 engaged with a follower catch 2002 on the hinge frame 1202. According to various implementations, engagement of the follower stopper 2000 with the follower catch 2002 prevents the cam follower 1206 from pivoting further about the follower axle 1600 and into interior portions of the hinge frame 1202. For instance, the position of the cam follower 1206 depicted in FIG. 20 represents a maximum pivot position of the cam follower 1206.

FIG. 20 further illustrates a support channel 2004 formed in the support plate 1500a. As further detailed below, the support channel 2004 engages with a support guide 2006a (shown in a subsequent figure) on the interior surface of the hinge frame 1202 to control movement of the support plate 1500a relative to the hinge frame 1202. In this particular view, a support guide 2006b is visible, which represents a guide feature for guiding movement of the support plate 1500b, depicted in previous figures.

Figure 21:
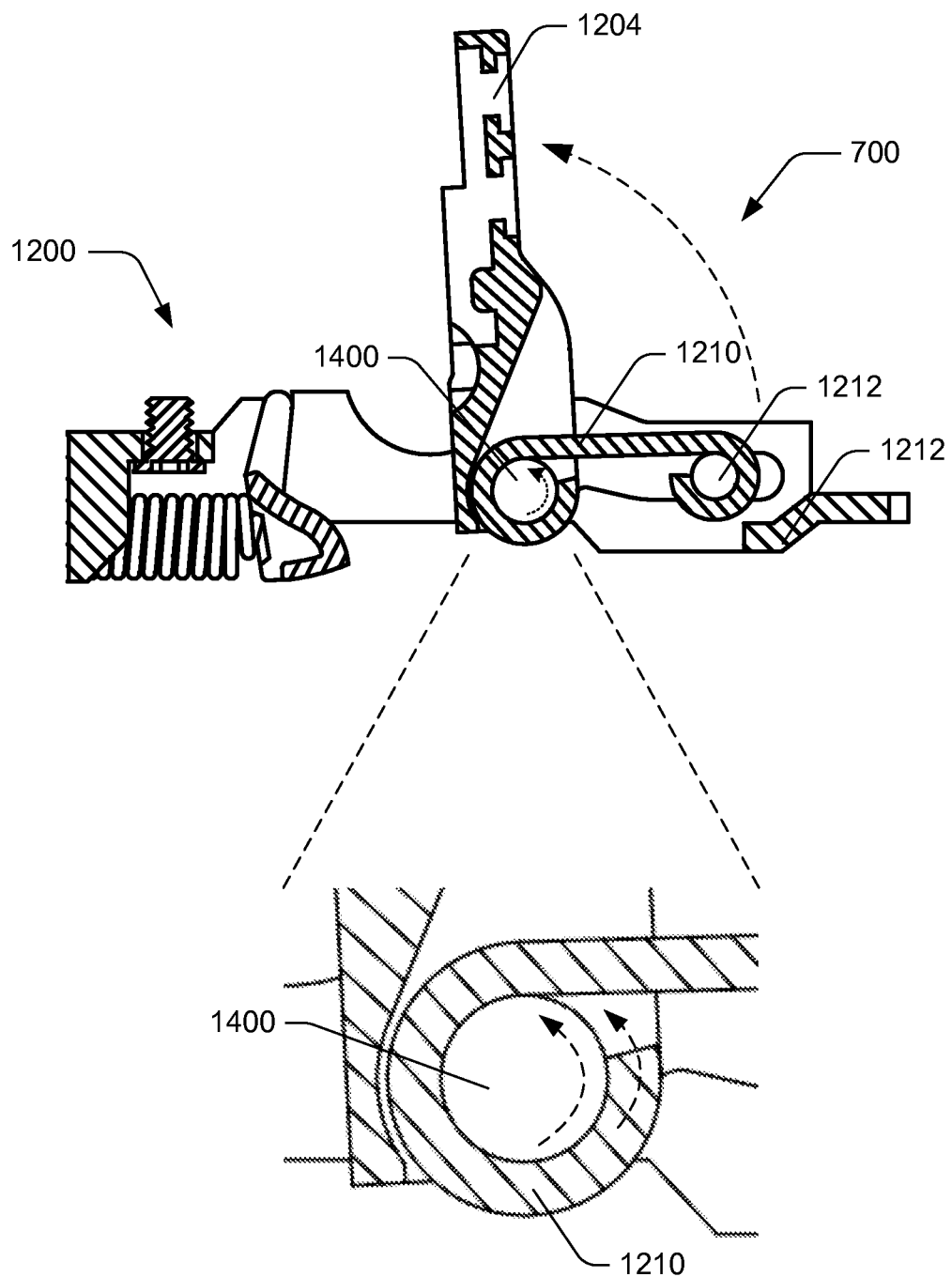
FIG. 21 depicts a side cutaway view of an example hinge in accordance with one or more embodiments.

FIG. 21 depicts a side cutaway view of the hinge 1200 in the position 700 in accordance with one or more implementations. Generally, pivoting of the cam 1204 from the position 500 to the position 700 causes a rotation of the friction pin 1400 relative to the hinge band 1210. For instance, movement of the hinge band 1210 is controlled by the interaction of the guide pin 1212 with the guide slot 1300 such that as the cam 1204 pivots, the friction pin 1400 rotates relative to the hinge band 1210.

The lower portion of FIG. 21 depicts an enlarged view of a side cutaway of the interface between the friction pin 1400 and the hinge band 1210. As illustrated in this particular implementation, the hinge band 1210 does not fully enclose the friction pin 1400. Accordingly, when the friction pin 1400 rotates in response to the cam 1204 pivoting in an opening direction, friction at the interface between the friction pin 1400 and the hinge band 1210 causes the hinge band 1210 to tighten around the hinge pin, thus contributing to an increase in torque required to open the hinge 1200 as the hinge 1200 continues to open. Further, when the cam 1204 is pivoted toward a closed position, friction between the friction pin 1400 and the hinge band 1210 tends to open the hinge band 1210 relative to the friction pin 1400, and thus decrease a torque required to close the hinge 1200. As explained with reference to the example torque curves discussed below, in at least some implementations the hinge 1200 exhibits an opening torque that is higher than a closing torque such that opening the hinge 1200 while the friction engine is engaged requires more torque than closing the hinge 1200 while the friction engine is engaged.

Figure 22:
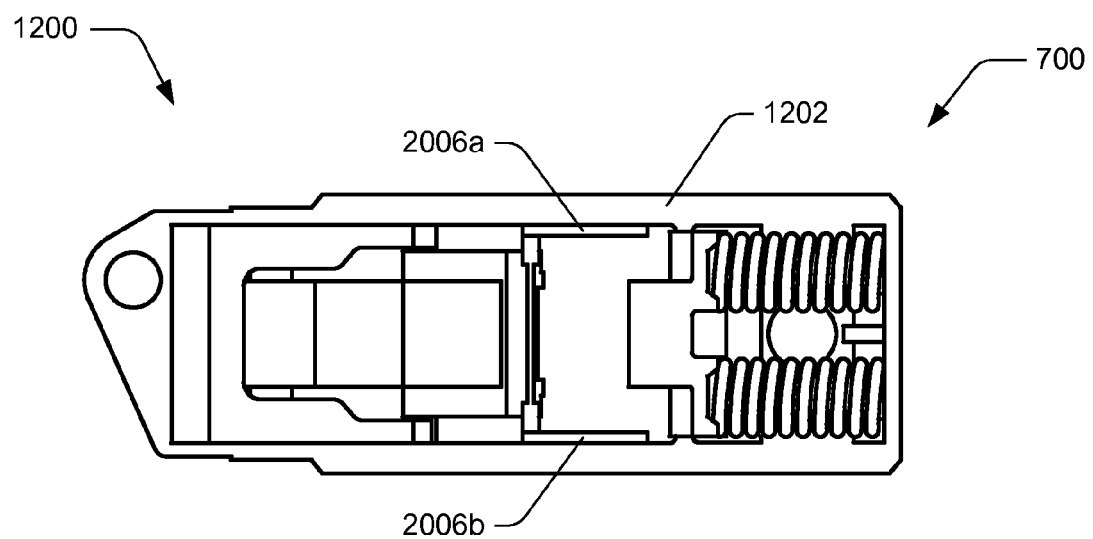
FIG. 22 depicts an overhead view of an example hinge in accordance with one or more embodiments.

FIG. 22 depicts an overhead view of the hinge 1200 in the position 700 in accordance with one or more implementations. Shown in FIG. 22 are the support guides 2006a, 2006b which represent curved protrusions on opposite inside surfaces of the hinge frame 1202. The support guides 2006a, 2006b, for instance, are features formed on opposite inside surfaces of the hinge frame 1202. According to various implementations, the support guides 2006a, 2006b engage within respective support channels of the support plates 1500a, 1500b to control movement of the support plates 1500a, 1500b.

Figure 23:
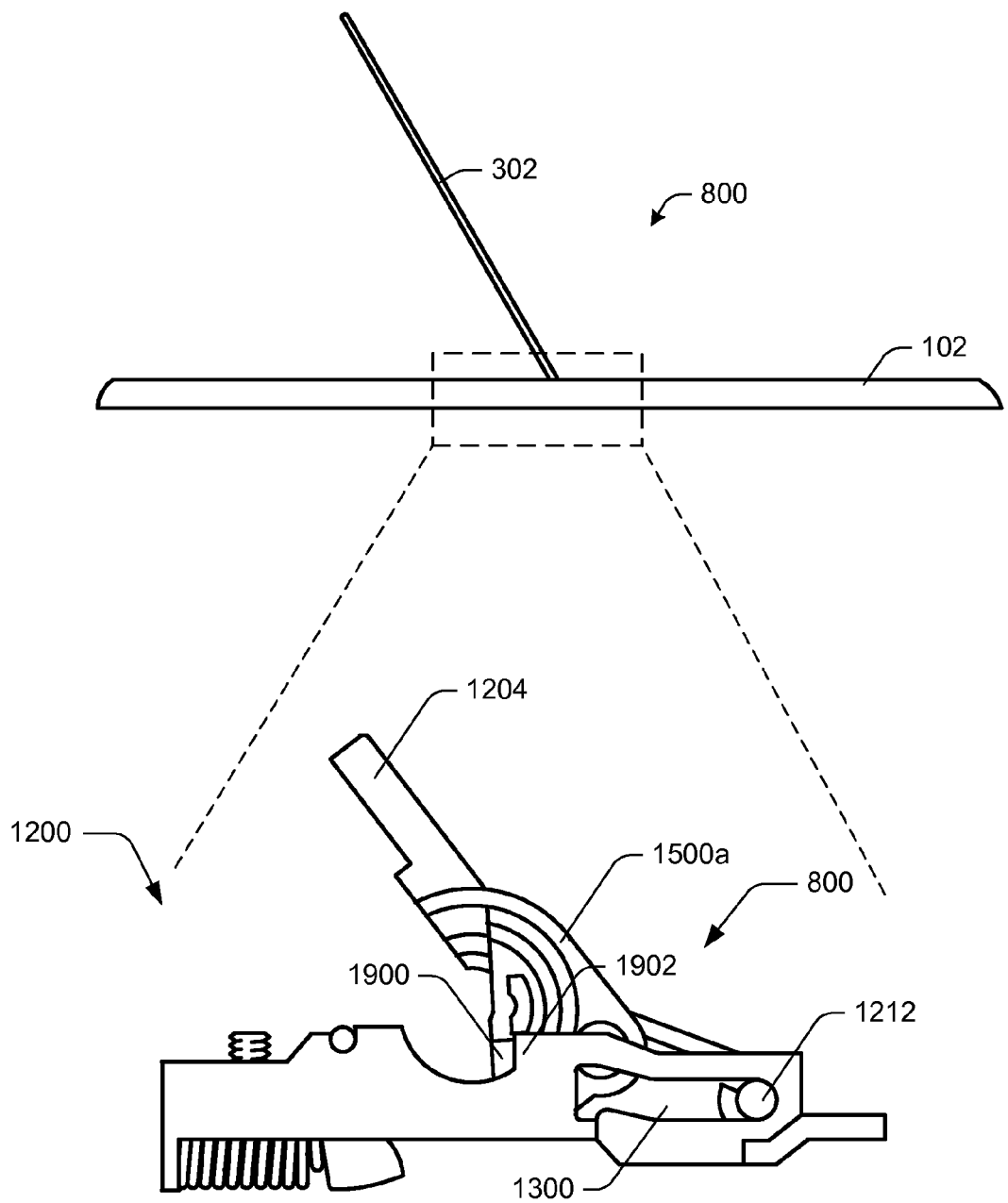
FIG. 23 depicts a side view of an example hinge in accordance with one or more embodiments.

FIG. 23 depicts a side view of the hinge 1200 opened to the position 800 in accordance with one or more implementations. For instance, a user manipulates the kickstand 302 from the preset open position 700 to the position 800 introduced with reference to FIG. 8.

FIG. 23 illustrates that when the cam 1204 pivots to the position 800, the plate stopper 1900 on the support plate 1500a remains engaged with the plate catch 1902 on the hinge frame 1202. Thus, the support plates 1500a, 1500b do not move further out of the hinge frame 1202. Further, at the position 800, the guide pin 1212 is engaged in a far end of the guide slot 1300. For instance, the guide pin 1212 has reached the farthest extent of its travel within the guide slot 1300.

Figure 24:
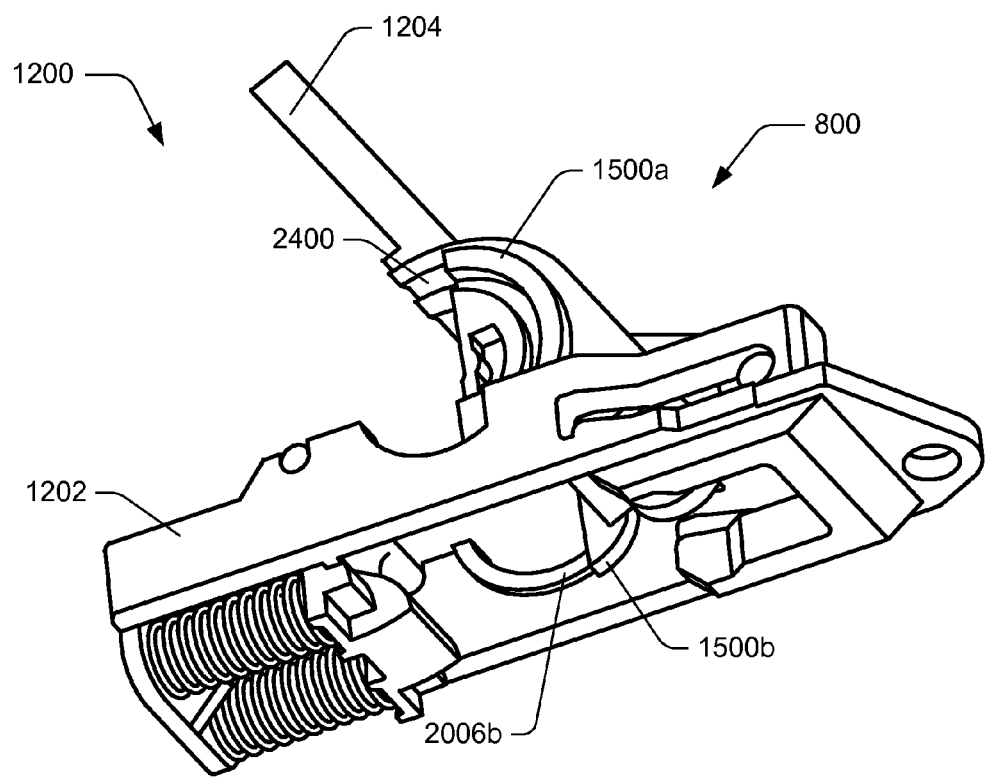
FIG. 24 depicts an isometric view of an example hinge in accordance with one or more embodiments.

FIG. 24 depicts an isometric view of the hinge 1200 in the position 800 in accordance with one or more implementations. This view illustrates that a side of the cam 1204 includes a cam slot 2400 which engages with the support plate 1500a to guide movement of the cam 1204. For instance, an inner surface of the support plate 1500a engages within the cam slot 2400 to guide movement of the cam 1204 in a rotational direction between various positions. Although not illustrated herein, the opposite side of the cam 1204 may include a similar cam slot in which the support plate 1500b engages to guide movement of the cam 1204.

Further depicted in FIG. 24 is the support plate 1500b, which engages with the support guide 2006b to guide movement of the support plate 1500b in a rotational direction relative to the hinge frame 1202.

Figure 25:
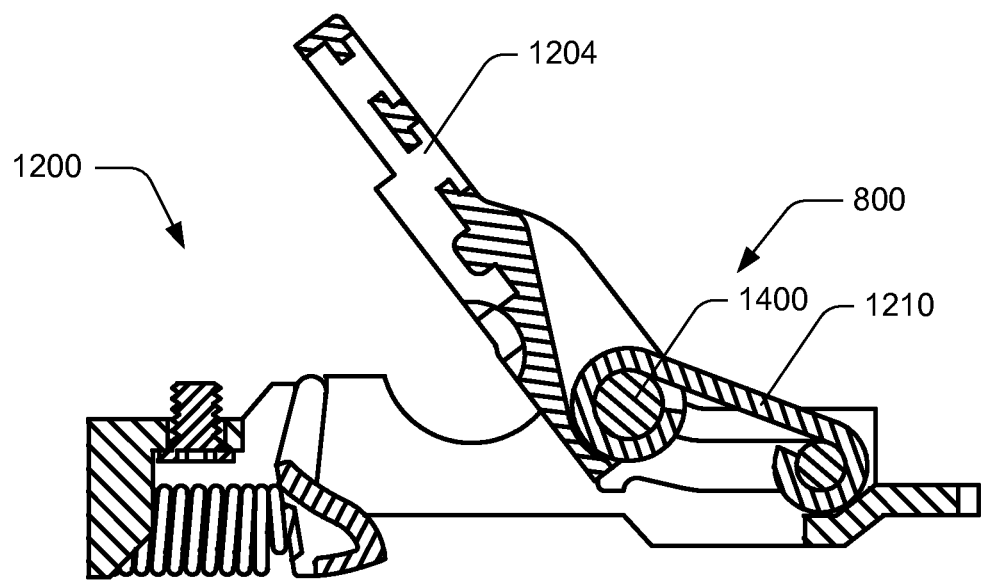
FIG. 25 depicts a side cutaway view of an example hinge in accordance with one or more embodiments.

FIG. 25 depicts a side cutaway view of the hinge 1200 in the position 800 in accordance with one or more implementations. Generally, pivoting of the cam 1204 from the position 700 to the position 800 causes a rotation of the friction pin 1400 relative to the hinge band 1210. As discussed above, torque resistance to opening of the cam 1204 results at least in part from the friction caused by the rotational interface between the friction pin 1400 and the hinge band 1210 during rotation of the friction pin 1400. Further, when the cam 1204 is pivoted in an opening direction, rotation of the friction pin 1400 within the hinge band 1210 tends to tighten the hinge band 1210 around the friction pin 1400, and thus increase frictional resistance of the friction pin 1400 to rotation within the hinge band 1210.

Figure 26:
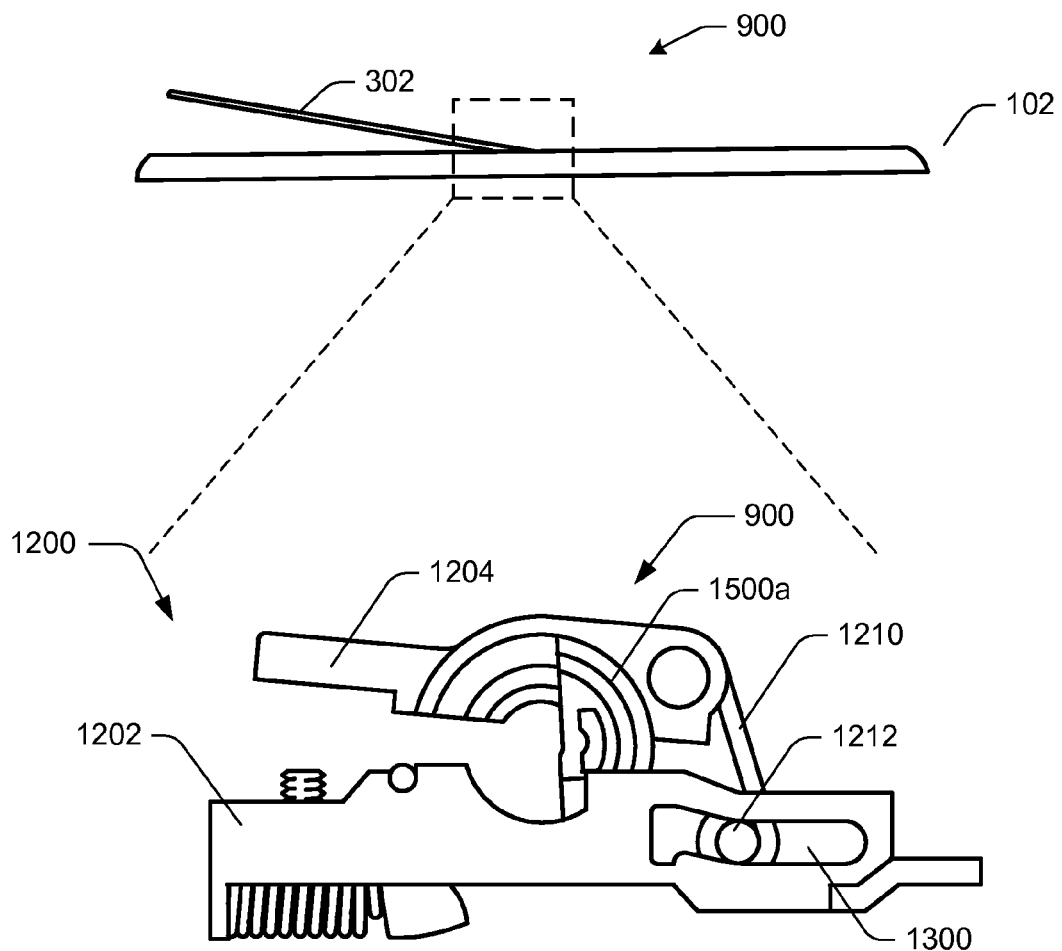
FIG. 26 depicts a side view of an example hinge in accordance with one or more embodiments.

FIG. 26 depicts a side view of the hinge 1200 opened to the position 900 in accordance with one or more implementations. For instance, a user manipulates the kickstand 302 from the preset open position 800 to the position 900 introduced with reference to FIG. 9. In at least some implementations, the position 900 represents a maximum opening position for the hinge 1200.

Notice that in transitioning to the position 900, the guide pin 1212 begins to move forward within the guide slot 1300. However, the guide pin 1212 remains constrained within the guide slot 1300. Thus, when the hinge 1200 is moved from the position 900 towards a closed position, the guide pin 1212 will remain engaged in the guide slot 1300 to control movement of the hinge band 1210 during pivoting of the cam 1204 toward a closed position within the hinge frame 1202.

FIG. 26 further illustrates that in the position 900, the cam 1204 is fully removed from within the hinge frame 1202. The cam 1204, however, remains engaged with the support plates 1500a, 1500b, and the support plates 1500a, 1500b remain engaged with the hinge frame 1202. Accordingly, in the position 900, the support plate 1500a, 1500b connect the cam 1204 to the hinge frame 1202, and thus enable the hinge 1200 to remain as an interconnected and integrated hinge mechanism even when the cam 1204 is fully removed from within the hinge frame 1202.

Figure 27:
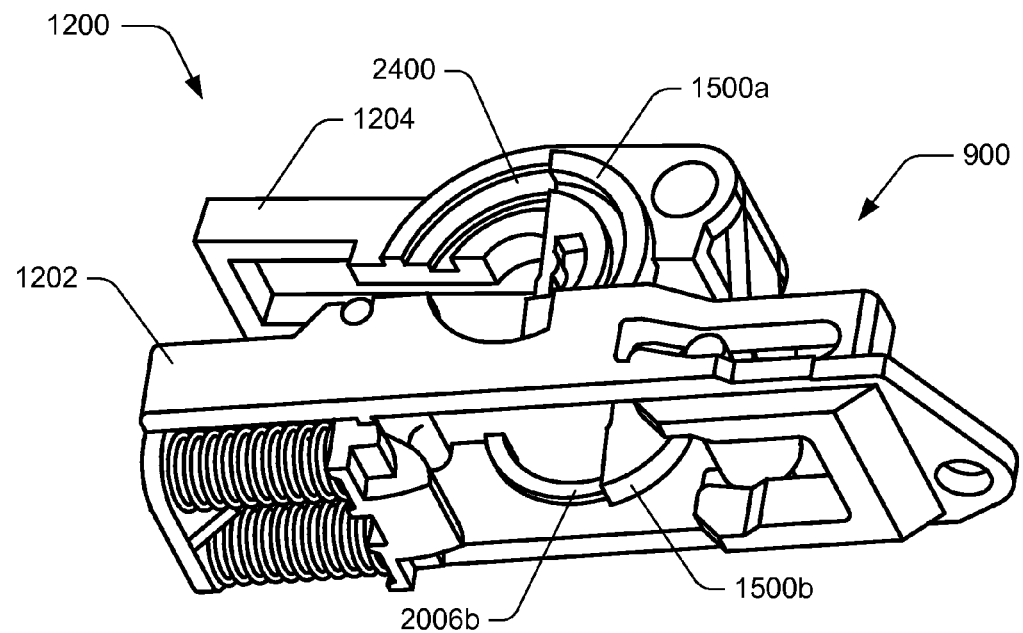
FIG. 27 depicts an isometric view of an example hinge in accordance with one or more embodiments.

FIG. 27 depicts an isometric view of the hinge 1200 in the position 900 in accordance with one or more implementations. As shown, the support plates 1500a, 1500b remain engaged with the hinge frame 1202, and the cam 1204 remains engaged with the support plates 1500a, 1500b. For instance, the support plate 1500a remains engaged with the cam slot 2400, and the support plate 1500b remains engaged with the support guide 2006b.

Figure 28:
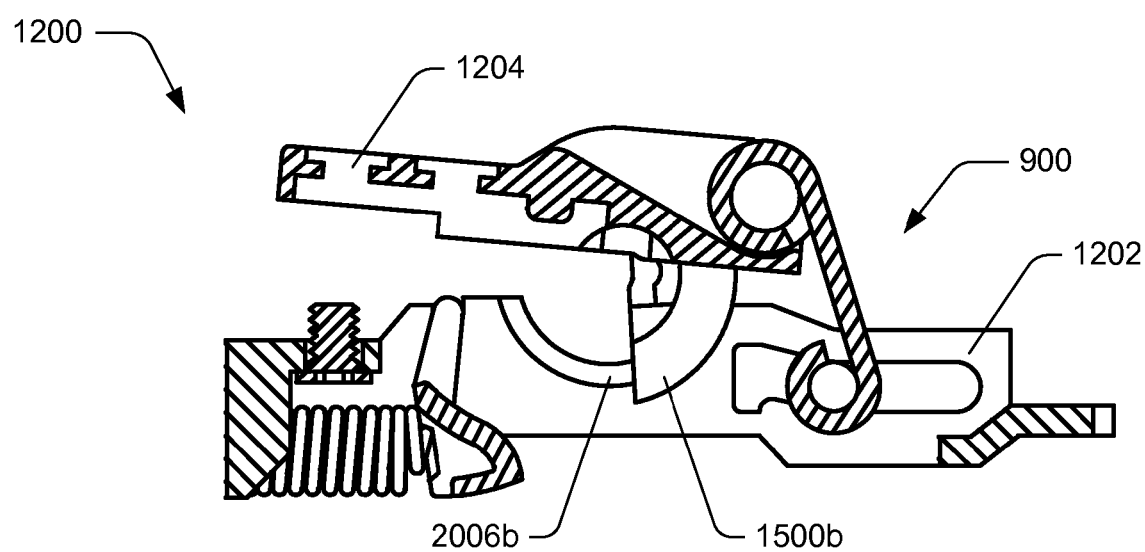
FIG. 28 depicts a side cross section view of an example hinge in accordance with one or more embodiments.

FIG. 28 depicts a side cross section view of the hinge 1200 in the position 900 in accordance with one or more implementations. This view emphasizes that the cam 1204 is fully removed from within the hinge frame 1202, but remains engaged with the support plates 1500a, 1500b. Further, the support plate 1500b remains engaged with the support guide 2006b on the inside surface of the hinge frame 1202.

Figure 29:
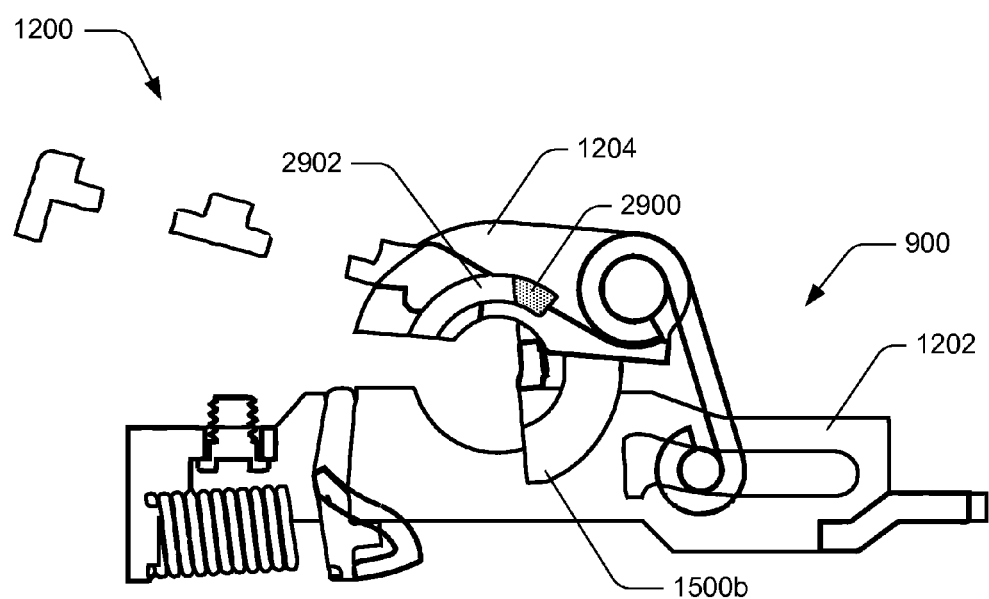
FIG. 29 depicts a side cutaway view of an example hinge in accordance with one or more embodiments.

FIG. 29 depicts a different side cross section view of the hinge 1200 in the position 900 in accordance with one or more implementations. This particular view shows that a cam stopper 2900 on the support plate 1500b engages with a stopper slot 2902 on the cam 1204. According to various implementations, this prevents the cam 1204 from opening further past the position 900. For instance, as discussed above and illustrated in previous figures, a plate stopper on the support plate 1500b is engaged with a plate catch on the hinge frame 1202 which prevents the support plate 1500b from rotating further out of the hinge frame 1202 from the position illustrated in FIG. 29. Accordingly, engagement of the cam stopper 2900 within the stopper slot 2902 prevents the cam 1204 from further opening movement past the position 900.

Figure 30:
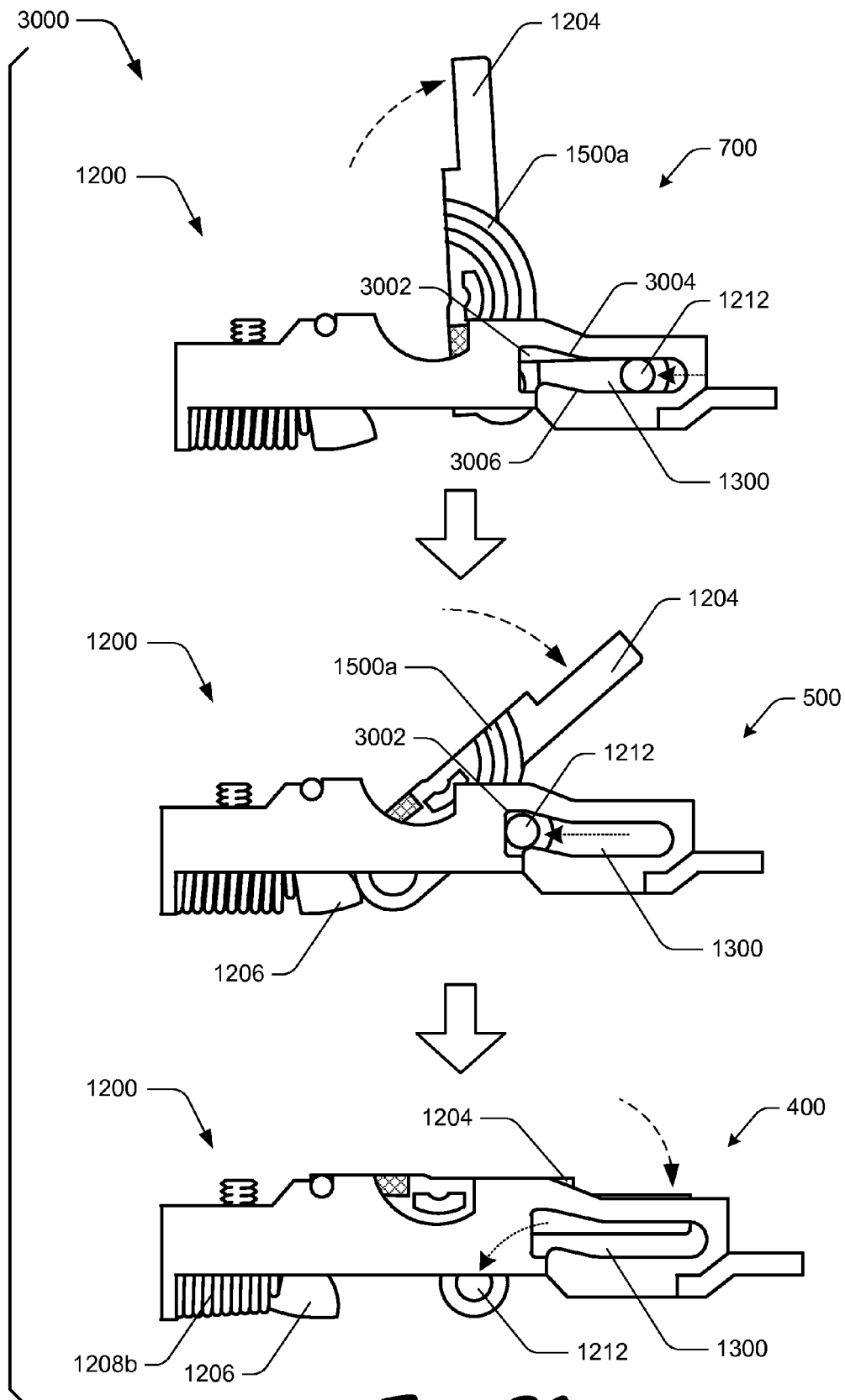
FIG. 30 depicts an example scenario for closing a hinge in accordance with one or more embodiments.

FIG. 30 depicts an example scenario 3000 for closing the hinge 1200 in accordance with one or more implementations. The scenario 3000, for instance, represents a scenario where the kickstand 302 is closed from a fully open position to a fully closed position. The upper portion of the scenario 3000 shows the hinge 1200 being moved in a closing direction from an open position to the position 700. For instance, a user manipulates the kickstand 302 from the position 900 to the position 700.

At the position 700, the cam 1204 engages with the support plate 1500a. For instance, the cam stopper 2900 of the support plate 1500a engages with an end of the stopper slot 2902, illustrated and discussed in FIG. 29. Accordingly, further closing of the hinge 1200 from the position 700 will cause the cam 1204 to pull the support plate 1500a toward a closed position along with the cam 1204.

The upper portion of the scenario 3000 further illustrates that at this point the guide pin 1212 is moving within the guide slot 1300 toward an open end 3002 of the guide slot 1300. Generally, when the hinge 1200 moves in an opening direction as depicted in the previous figures, pressure from the guide pin 1212 during movement within the guide slot 1300 is applied against an upper surface 3004 of the guide slot 1300. However, during movement of the hinge 1200 in a closing direction as depicted here, pressure from the guide pin 1212 is applied against a lower surface 3006 of the guide slot 1300. Accordingly, a surface profile of the lower surface 3006 affects torque forces observed during closing of the hinge 1200.

Proceeding to the center of the scenario 3000, the hinge 1200 is moved from the position 700 to the position 500. For instance, a user manipulates the kickstand 302 from the position 700 to the position 500. Accordingly, the guide pin 1212 moves within the guide slot 1300 to the open end 3002. Further, the cam 1204 engages with the cam follower 1206. Thus, in a closing scenario, the position 500 represents a transition (a "handoff") from a friction-based torque profile to a spring-activated torque profile. Notice further that at this point, the support plate 1500a moves along with the cam 1204.

Proceeding to the lower portion of the scenario 3000, the hinge 1200 is moved from the position 500 to the position 400. For instance, a user manipulates the kickstand 302 from the position 500 to the position 400, i.e., a closed position. Notice that moving the hinge 1200 to the position 400 causes the guide pin 1212 to disengage from the guide slot 1300. Further, movement from the position 500 to the position 400 is resisted by the cam follower 1206. For instance, the cam springs 1208a, 1208b exert spring force against the cam follower 1206, which in turn exerts force against the cam 1204. As discussed above, if a user releases the kickstand 302 at an angle within the opening angle range 602, the hinge 1200 will snap into the position 500. However, if the user releases the kickstand 302 at an angle within the closing angle range 604, the hinge 1200 will snap into the position 400, i.e., a closed position.

Having discussed some example kickstand and hinge positions, consider now a discussion of an example responsiveness profile associated with movement between the different hinge positions.

Hinge Response Profile

Considering the different positions of the hinge 1200 and the kickstand 302 discussed above, a torque response profile experienced during movement of the kickstand 302 between the different positions is influenced by various factors. For instance, between a closed position and the preset open position, hinge response is based primary on a spring-activated mechanism, e.g., interaction between the cam follower 1206 against the cam 1204. However, beyond the first preset open position, hinge response is based primarily on the friction engine that includes interaction between the friction pin 1400 and the hinge band 1210.

In at least some embodiments, responsiveness of the hinge 1200 can be characterized via torque profiles that indicate various forces that occur during movement of the kickstand 302 between various positions. Consider, for example, the following example torque profiles.

Figure 31:
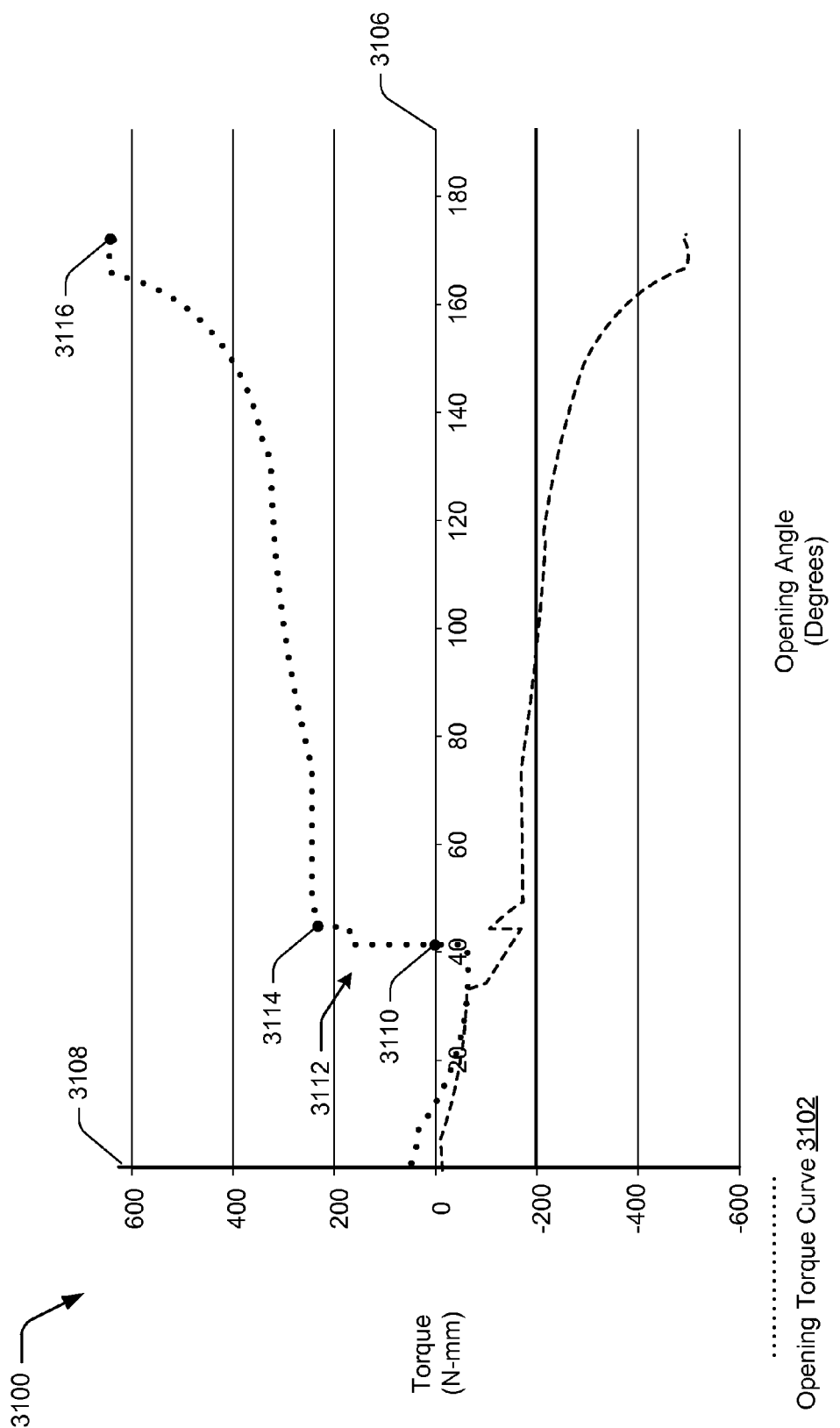
FIG. 31 illustrates an example torque graph for a hinge mechanism in accordance with one or more embodiments.

FIG. 31 illustrates a torque graph 3100 that includes an opening torque curve 3102 and a closing torque curve 3104. The torque graph 3100 further includes an angle axis 3106 and a torque axis 3108. The angle axis 3106 (e.g., the x-axis) indicates opening angle values for the kickstand 302 relative to an associated apparatus, e.g., the computing device 102. The torque axis 3108 (e.g., the y-axis) indicates different torque values for the torque graph 3400. In this particular example, the torque values are indicated in Newton-millimeters (N-mm) This is not to be interpreted as limiting, however, and torque values may be measured in a variety of different units. Further, different forces may be measured to characterize the movement of the hinge 1200 and/or the kickstand 302.

According to one or more implementations, the opening torque curve 3102 represents torque transferred from the kickstand 302 to the cam 1104 when the kickstand is opened (e.g., via user manipulation) from a closed position to various open positions. The closing torque curve 3104 represents torque transferred from the kickstand 302 to the cam 1104 when the kickstand is moved (e.g., via user manipulation) from various open positions towards a closed position.

As further detailed below, the different torque curves are associated with certain "action points" or "action regions" that demonstrate the overall responsiveness profile of the hinge mechanisms discussed herein. The opening torque curve 3102, for instance, indicates that when the kickstand 302 is initially opened from a closed position of 0°, opening of the kickstand 302 is resisted by a positive torque. However, once the kickstand 302 reaches an angle of approximately 15°, the opening torque curve 3102 crosses into the negative torque region of the torque graph 3100. According to various implementations, this represents an interaction between the cam follower 1206 and the cam 1204.

For instance, below 15°, force applied by the cam follower 1206 against the cam 1204 resists movement of the cam 1204. The angle range of 0° to 15°, for example, corresponds to the closing angle range 604 discussed above. At an angle above 15°, however, force applied by the cam follower 1206 against the cam 1204 drives movement of the cam 1204 to a preset open position 3110. In this particular example, the preset open position 3110 represents an angle of approximately 42°. The preset open position 3110, for example, represents the position 500 introduced with reference to FIG. 5. For instance, an angle range of 16° to 42° corresponds to the opening angle range 602 described above. As discussed above, if the kickstand 302 is released at an angle within the opening angle range 602, the kickstand 302 and thus the hinge 1200 will snap into an open position, e.g., the preset open position 3110.

Notice that torque force increases rapidly at an angle above the preset open position 3110, indicating a resistance to opening the hinge 1200 past the preset open position 3110, e.g., the position 500. According to various implementations, a transition region 3112 of the opening torque curve 3102 represents the force required to disengage the cam 1204 from the cam follower 1206. A transition point 3114 represents a point on the opening torque curve 3102 where the cam 1204 has disengaged from the cam follower 1206, and the guide pin 1212 has engaged with the guide slot 1300. For instance, at an angle above the transition point 3114, torque forces that apply to movement of the hinge 1200 are based on a friction torque profile generated using the friction engine described above.

Above the transition point 3114, torque resistance to opening of the hinge 1200 gradually increases until the hinge 1200 reaches a maximum open ("max") position 3116. The max position 3116, for instance, represents the position 900 introduced above with reference to FIG. 9. According to various implementations, if a user manipulates the kickstand 302 to any position between the transition point 3114 and the max position 3116 and releases the kickstand 302, the hinge 1200 and thus the kickstand 302 will remain in the released position absent external force to move the kickstand 302 from that position. The angle range between the transition point 3114 and the max position 3116, for example, represents the friction angle range 600 described above.

Thus, the opening torque curve 3102 illustrates that as the kickstand 302 is opened from the preset open position 3110 (e.g., the position 500), torque force generated by movement of the hinge 1200 increases as the hinge 1200 is opened to further open positions. This generally indicates that as the kickstand 302 is opened further past the position 500, torque that resists movement of the kickstand 302 to further open positions increases until the max position 3116 is reached. For instance, consider that as the kickstand 302 is opened further past the position 500, gravitational force transferred to the hinge 1200 increases due to increasing weight of the computing device 102 being borne by the kickstand 302, and thus the hinge 1200. According to various implementations, the increase in torque as the hinge 1200 opens accounts for (e.g., resists) this increase in downward gravitational force on the hinge 1200, thus enabling the hinge 1200 to assume various open positions within the friction angle range 600 without collapsing to the max position 3116, e.g., the position 900.

When closing the kickstand 302 from the max position 3116 and/or other open position, torque acting on the cam 1204 is characterized by the closing torque curve 3104. Generally, the interpretation of the closing torque curve 3104 is opposite that of the opening torque curve 3102 since the direction of motion (e.g., closing vs. opening) is reversed. In at least some embodiments, for example, negative torque values on the closing torque curve 3104 represent closing torque applied by the user to the kickstand 302.

As indicated by the closing torque curve 3104, closing torque forces that resist closing of the hinge 1200 are less than those that resist opening of the hinge 1200. For instance, as described above, frictional resistance to rotation of the friction pin 1400 within the hinge band 1210 is greater when opening the hinge 1200 than when closing the hinge 1200.

Generally, the torque graph 3100 is based on the curved horizontal profile of the guide slot 1300 illustrated in the accompanying figures. For instance, changing the profile of the guide slot 1300 can change the resistance to movement of the guide pin 1212 within the guide slot 1300, as well as force transferred from the guide pin 1212 to the friction pin 1400 via the hinge band 1210. For instance, changing the profile of the upper surface 3004 of the guide slot 1300 changes resistance to movement of the guide pin 1212 within the guide slot 1300 when the hinge 1200 is moved in an opening direction. Changing the contour of the upper surface 3004, for example, changes the opening torque curve 3102, such as by increasing or decreasing torque values at different points along the curve. Further, changing the profile of the lower surface 3006 of the guide slot 1300 changes resistance to movement of the guide pin 1212 within the guide slot 1300 when the hinge 1200 is moved in a closing direction. Changing the contour of the lower surface 3006, for example, changes the closing torque curve 3104, such as by increasing or decreasing torque values at different points along the curve. Thus, changing the profile of the guide slot 1300 will change the torque forces that occur during movement of the kickstand 302. Accordingly, torque response of the hinge 1200 may be customized by changing the inner surface profile along different surfaces the guide slot 1300.

Accordingly, embodiments discussed herein provide a hinge mechanism that enables an attached component (e.g., a kickstand) to be adjusted between multiple positions. Further, the hinge mechanism includes multiple activity stages, such as a spring-activated stage and a friction stage. It is to be appreciated that the example device orientations, kickstand positions, hinge positions, hinge preset positions, component scale, torque values, and so forth discussed above are presented for purposes of example only. Thus, a wide variety of different device orientations, kickstand positions, hinge positions, hinge preset positions, and torque values not specifically mentioned herein may be implemented within the spirit and scope of the claimed embodiments.

For instance, an attachment mechanism used to attach a kickstand to a computing device (e.g., the hinge 1100 discussed above) can include any number and/or configuration of suitable preset stop positions to enable the kickstand to be opened to a variety of different positions to support various orientations of a computing device. Further, example hinges can be attached at any suitable position and/or portion of a kickstand and/or computing device in accordance with the claimed embodiments.

Example System and Device

Figure 32:
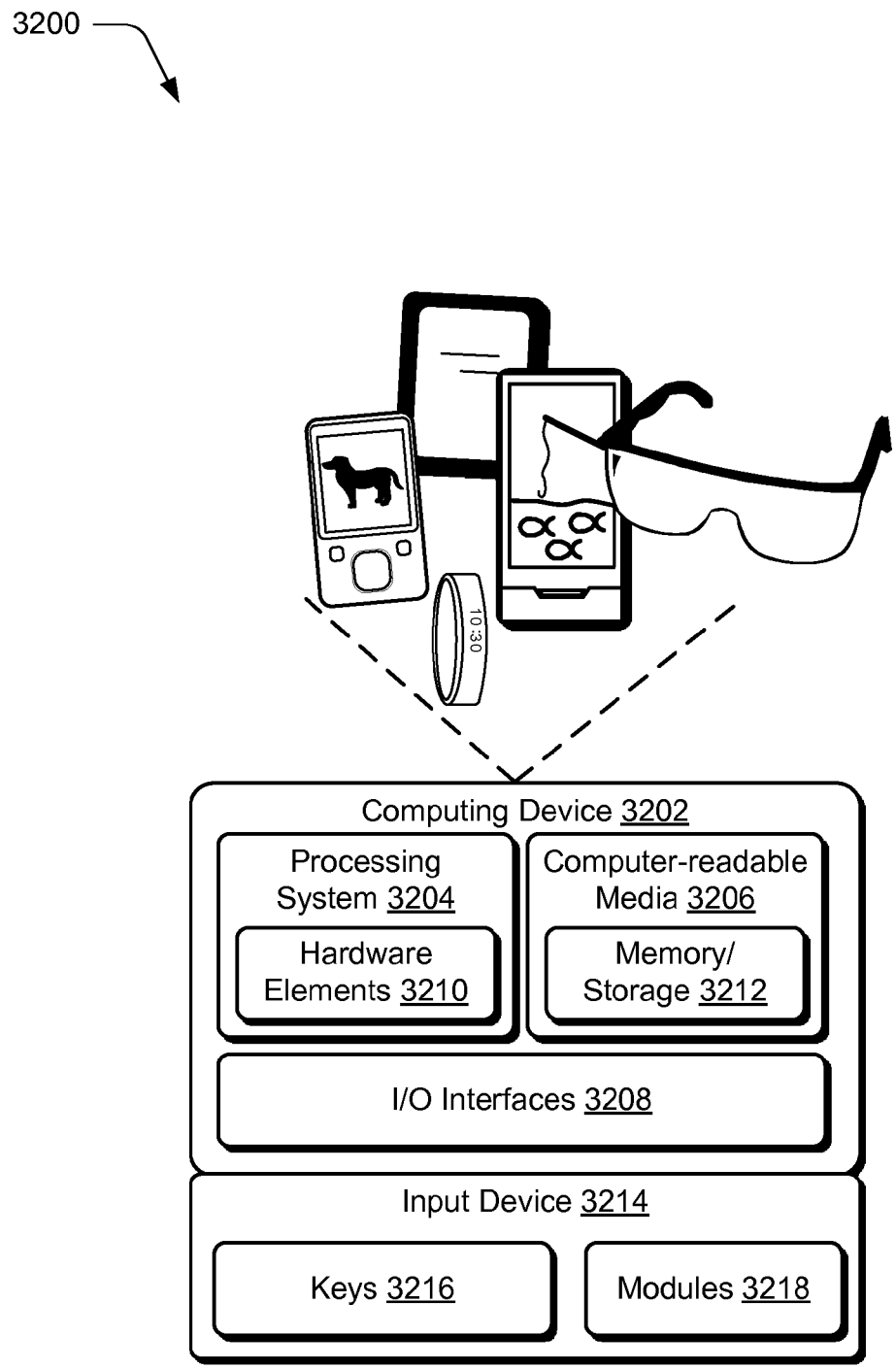
FIG. 32 illustrates an example system including various components of an example device that can be implemented as any type of computing device as described with reference to FIGS. 1-31 to implement embodiments of the techniques described herein.

FIG. 32 illustrates an example system generally at 3200 that includes an example computing device 3202 that is representative of one or more computing systems and/or devices that may implement the various techniques described herein. In at least some implementations, the computing device 3202 represents an implementation of the computing device 102 discussed above. The computing device 3202 may be, for example, be configured to assume a mobile configuration through use of a housing formed and sized to be grasped and carried by one or more hands of a user, illustrated examples of which include a mobile phone, mobile game and music device, and tablet computer although other examples are also contemplated. In at least some implementations, the computing device 102 may be implemented as a wearable device, such as a smart watch, smart glasses, and so forth.

The example computing device 3202 as illustrated includes a processing system 3204, one or more computer-readable media 3206, and one or more I/O interface 3208 that are communicatively coupled, one to another. Although not shown, the computing device 3202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 3204 is representative of functionality to perform one or more operations using hardware. Accordingly, the processing system 3204 is illustrated as including hardware element 3210 that may be configured as processors, functional blocks, and so forth. This may include implementation in hardware as an application specific integrated circuit or other logic device formed using one or more semiconductors. The hardware elements 3210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 3206 is illustrated as including memory/storage 3212. The memory/storage 3212 represents memory/storage capacity associated with one or more computer-readable media. The memory/storage component 3212 may include volatile media (such as random access memory (RAM)) and/or nonvolatile media (such as read only memory (ROM), Flash memory, optical disks, magnetic disks, and so forth). The memory/storage component 3212 may include fixed media (e.g., RAM, ROM, a fixed hard drive, and so on) as well as removable media (e.g., Flash memory, a removable hard drive, an optical disc, and so forth). The computer-readable media 3206 may be configured in a variety of other ways as further described below.

Input/output interface(s) 3208 are representative of functionality to allow a user to enter commands and information to computing device 3202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 3202 may be configured in a variety of ways to support user interaction.

The computing device 3202 is further illustrated as being communicatively and physically coupled to an input device 3214 that is physically and communicatively removable from the computing device 3202. In this way, a variety of different input devices may be coupled to the computing device 3202 having a wide variety of configurations to support a wide variety of functionality. In this example, the input device 3214 includes one or more keys 3216, which may be configured as pressure sensitive keys, mechanically switched keys, and so forth.

The input device 3214 is further illustrated as include one or more modules 3218 that may be configured to support a variety of functionality. The one or more modules 3218, for instance, may be configured to process analog and/or digital signals received from the keys 3216 to determine whether a keystroke was intended, determine whether an input is indicative of resting pressure, support authentication of the input device 3214 for operation with the computing device 3202, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 3202. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 3202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 3210 and computer-readable media 3206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 3210. The computing device 3202 may be configured to implement particular instructions and/or functions corresponding to the software and/or hardware modules. Accordingly, implementation of a module that is executable by the computing device 3202 as software may be achieved at least partially in hardware, e.g., through use of computer-readable storage media and/or hardware elements 3210 of the processing system 3204. The instructions and/or functions may be executable/operable by one or more articles of manufacture (for example, one or more computing devices 3202 and/or processing systems 3204) to implement techniques, modules, and examples described herein.

Implementations discussed herein include:

Example 1: A device including: a support movably attached to a rear portion of the mobile device; and at least one hinge that moveably attaches a portion of the support to the mobile device, the hinge including: a first activity stage wherein movement of the hinge is controlled based on a spring; and a second activity stage wherein movement of the hinge is controlled based on frictional force.

Example 2: A device as described in example 1, wherein the first activity stage is engageable in response to moving the support between a closed position relative to the device and a preset open position relative to the device, and wherein the second activity stage is engageable in response to opening the support past the preset open position.

Example 3: A device as described in one or more of examples 1 or 2, wherein the first activity stage is engageable in response to moving the support between a closed position relative to the device and a preset open position relative to the device, and wherein movement past the preset open position causes the second activity stage to be engaged and the first activity stage to be disengaged.

Example 4: A device as described in one or more of examples 1-3, wherein the first activity stage is not engaged when the second activity stage is engaged.

Example 5: A device as described in one or more of examples 1-4, wherein the first activity stage and the second activity stage are alternately engageable.

Example 6: A device as described in one or more of examples 1-5, wherein the first activity stage is associated with a first angle range of angles of the support relative to the rear portion of the device, and wherein the second activity stage is associated with a second angle range of angles of the support relative to the rear portion of the device.

Example 7: A device as described in one or more of examples 1-6, wherein when the second activity stage is engaged, a torque force for opening the support from a particular position relative to the rear portion device is greater than a torque force for closing support component from the particular position relative to the device.

Example 8: A hinge including: a first activity stage wherein movement of the hinge is based on a spring-of the hinge; and a second activity stage wherein the spring is disengaged and movement of the hinge is based on frictional force provided by a friction mechanism of the hinge.

Example 9: A hinge as described in example 8, wherein opening of the hinge from a closed position to a preset open position is according to the first activity stage, and opening of the hinge past the preset open position is according to the second activity stage.

Example 10: A hinge as described in one or more of examples 8 or 9, wherein in the second activity stage, torque that resists opening of the hinge increases as the hinge is moved in an opening direction.

Example 11: A hinge as described in one or more of examples 8-10, wherein the hinge includes: a hinge frame; a cam rotatably mounted within the hinge frame; a cam follower pivotably mounted to the hinge frame adjacent to the cam; and a hinge spring positioned between the hinge frame and the cam follower such that when the hinge is in the first activity stage, spring force from the hinge spring engages the cam follower against the cam.

Example 12: A hinge as described in one or more of examples 8-11, wherein the hinge includes: a hinge frame; a cam rotatably mounted within the hinge frame; a cam follower pivotably mounted to the hinge frame adjacent to the cam; a hinge spring positioned between the hinge frame and the cam follower such that when the hinge is in the first activity stage, spring force from the hinge spring engages the cam follower against the cam; and a follower catch positioned on the hinge frame to prevent the cam follower from engaging with the cam when the hinge is in the second activity stage.

Example 13: A hinge as described in one or more of examples 8-12, wherein the hinge includes: a hinge frame; a first support plate slidably engaged with a first support guide on a first interior surface of the hinge frame; a second support plate slidably engaged with a second support guide on a second interior surface of the hinge frame opposite the first interior surface; and a cam slidably engaged with the first support plate and the second support plate such that the cam is rotatable from within the hinge frame to a position outside of the hinge frame while remaining engaged with the first support plate and the second support plate.

Example 14: A hinge as described in one or more of examples 8-13, wherein the hinge includes: a hinge frame; a cam rotatably mounted within the hinge frame; a friction pin fastened to the cam; and a hinge band that at least partially wraps the friction pin such that the friction pin is rotatable relative to the hinge band and interaction between the friction pin and the hinge band represents at least a portion of the friction mechanism.

Example 15: A hinge as described in one or more of examples 8-14, wherein the hinge includes: a hinge frame with a guide slot formed therein; a cam rotatably mounted within the hinge frame; a friction pin fastened to the cam; a hinge band rotatably fastened to the friction pin at a first end of the hinge band; and a guide pin fastened to a second end of the hinge band such that when the cam is rotated to a particular position relative to the hinge frame, the guide pin engages within the guide slot and further rotation of the cam causes frictional interaction between the friction pin and the cam that represents at least a portion of the friction mechanism.

Example 16: A hinge as described in one or more of examples 8-15, wherein the hinge includes: a hinge frame with a guide slot formed therein; a cam rotatably mounted within the hinge frame; a friction pin fastened to the cam; a hinge band rotatable fastened to the friction pin at a first end of the hinge band; and a guide pin fastened to a second end of the hinge band such that when the cam is rotated to a particular position relative to the hinge frame, the guide pin engages within the guide slot and further rotation of the cam causes frictional interaction between the friction pin and the cam that represents at least a portion of the friction mechanism, and wherein changing an inner surface profile of the guide slot changes an interaction of the guide pin with the guide slot and thus changes a torque profile of the hinge.

Example 17: An apparatus including: a chassis; a moveable component moveably attached to the chassis; and a multistage hinge that moveably attaches the moveable component to the chassis and that is positionable in multiple preset open positions, the multistage hinge including: a first activity stage wherein movement of the multistage hinge is controlled based on a spring; and a second activity stage wherein the spring is disengaged and movement of the multistage hinge is controlled based on frictional force provided by a friction mechanism.

Example 18: An apparatus as described in example 17, wherein the apparatus includes a computing device, the chassis includes a display device, and wherein the moveable component includes a support component that is moveable via the multistage hinge to support different viewing angles for the display device.

Example 19: An apparatus as described in one or more of examples 17 or 18, wherein the second activity stage is associated with a friction angle range of angles of the support component relative to the chassis, the multistage hinge configured such that when the support component is positioned at a particular angle within the friction angle range, the support component persists at the particular angle absent external force to move the support component.

Example 20: An apparatus as described in one or more of examples 17-19, wherein the second activity stage is associated with a friction angle range of angles of the support component relative to the chassis, the multistage hinge configured such that opening the support component from a particular angle within the frictional angle range requires more torque than closing the support component from the particular angle.

Conclusion

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A device comprising:
   a support movably attached to a rear portion of the device; and
   a hinge that moveably attaches a portion of the support to the device, the hinge including:
   a cam rotatably mounted within a hinge frame and attached to the support;
   a first activity stage wherein movement of the cam is controlled based on a spring; and
   a second activity stage wherein movement of the cam is controlled based on frictional force, the first activity stage being disengaged from the cam when the second activity stage is engaged.

2. A device as recited in claim 1, wherein the first activity stage is engageable in response to moving the support between a closed position relative to the device and a preset open position relative to the device, and wherein the second activity stage is engageable in response to opening the support past the preset open position.

3. A device as recited in claim 1, wherein the first activity stage is engageable in response to moving the support between a closed position relative to the device and a preset open position relative to the device, and wherein movement past the preset open position causes the second activity stage to be engaged and the first activity stage to be disengaged.

4. A device as recited in claim 1, wherein the first activity stage is associated with a first angle range of angles of the support relative to the rear portion of the device, and wherein the second activity stage is associated with a second angle range of angles of the support relative to the rear portion of the device.

5. A device as recited in claim 1, wherein when the second activity stage is engaged, a torque force for opening the support from a particular position relative to the rear portion of the device is greater than a torque force for closing the support from the particular position relative to the device.

6. A device as recited in claim 1, wherein in the second activity stage, torque that resists opening of the hinge increases as the hinge is moved in an opening direction.

7. A device as recited in claim 1, wherein the spring provides resistance to rotating the support away from the rear portion of the device for a portion of the first activity stage.

8. A hinge comprising:
   a cam rotatably mounted within a hinge frame;
   a first activity stage wherein movement of the cam is based on a spring of the hinge; and
   a second activity stage wherein the spring is disengaged from the cam and movement of the cam is based on frictional force provided by a friction mechanism of the hinge.

9. A hinge as recited in claim 8, wherein opening of the hinge from a closed position to a preset open position is according to the first activity stage, and opening of the hinge past the preset open position is according to the second activity stage.

10. A hinge as recited in claim 8, wherein in the second activity stage, torque that resists opening of the hinge increases as the hinge is moved in an opening direction.

11. A hinge as recited in claim 8, wherein the hinge comprises:
    a cam follower pivotably mounted to the hinge frame adjacent to the cam; and
    a hinge spring positioned between the hinge frame and the cam follower such that when the hinge is in the first activity stage, spring force from the hinge spring engages the cam follower against the cam.

12. A hinge as recited in claim 8, wherein the hinge comprises:
    a cam follower pivotably mounted to the hinge frame adjacent to the cam;
    a hinge spring positioned between the hinge frame and the cam follower such that when the hinge is in the first activity stage, spring force from the hinge spring engages the cam follower against the cam; and
    a follower catch positioned on the hinge frame to prevent the cam follower from engaging with the cam when the hinge is in the second activity stage.

13. A hinge as recited in claim 8, wherein the hinge comprises:
    a first support plate slidably engaged with a first support guide on a first interior surface of the hinge frame;
    a second support plate slidably engaged with a second support guide on a second interior surface of the hinge frame opposite the first interior surface; and
    wherein the cam is slidably engaged with the first support plate and the second support plate such that the cam is rotatable from within the hinge frame to a position outside of the hinge frame while remaining engaged with the first support plate and the second support plate.

14. A hinge as recited in claim 8, wherein the hinge comprises:
    a friction pin fastened to the cam; and
    a hinge band that at least partially wraps the friction pin such that the friction pin is rotatable relative to the hinge band and interaction between the friction pin and the hinge band represents at least a portion of the friction mechanism.

15. A hinge as recited in claim 8, wherein the hinge comprises:
    a guide slot formed on the hinge frame;
    a friction pin fastened to the cam;
    a hinge band rotatably fastened to the friction pin at a first end of the hinge band; and
    a guide pin fastened to a second end of the hinge band such that when the cam is rotated to a particular position relative to the hinge frame, the guide pin engages within the guide slot and further rotation of the cam causes frictional interaction between the friction pin and the cam that represents at least a portion of the friction mechanism.

16. A hinge as recited in claim 8, wherein the hinge comprises:
a guide slot formed on the hinge frame;
a friction pin fastened to the cam;
a hinge band rotatably fastened to the friction pin at a first end of the hinge band; and
a guide pin fastened to a second end of the hinge band such that when the cam is rotated to a particular position relative to the hinge frame, the guide pin engages within the guide slot and further rotation of the cam causes frictional interaction between the friction pin and the cam that represents at least a portion of the friction mechanism, and wherein changing an inner surface profile of the guide slot changes an interaction of the guide pin with the guide slot and thus changes a torque profile of the hinge.

17. An apparatus comprising:
a chassis;
a moveable component moveably attached to the chassis; and
a multistage hinge that moveably attaches the moveable component to the chassis and that is positionable in multiple preset open positions, the multistage hinge including:
a hinge frame;
a cam rotatably mounted within the hinge frame and attached to the moveable component;
a first activity stage wherein movement of the cam is controlled based on a spring; and
a second activity stage wherein the spring is disengaged and movement of the cam is controlled based on frictional force provided by a friction mechanism.

18. An apparatus as described in claim 17, wherein the apparatus comprises a computing device, the chassis includes a display device, and wherein the moveable component comprises a support component that is moveable via the multistage hinge to support different viewing angles for the display device.

19. An apparatus as described in claim 17, wherein the second activity stage is associated with a friction angle range of angles of the support component relative to the chassis, the multistage hinge configured such that when the support component is positioned at a particular angle within the friction angle range, the support component persists at the particular angle absent external force to move the support component.

20. An apparatus as described in claim 17, wherein the second activity stage is associated with a friction angle range of angles of the support component relative to the chassis, the multistage hinge configured such that opening the support component from a particular angle within the frictional angle range requires more torque than closing the support component from the particular angle.

* * * * *